(12) United States Patent
Schaefer et al.

(10) Patent No.: US 10,537,189 B2
(45) Date of Patent: *Jan. 21, 2020

(54) RECEPTION SYSTEM FOR RECEIVING OBJECTS

(71) Applicant: WINCOR NIXDORF INTERNATIONAL GMBH, Paderborn (DE)

(72) Inventors: Oliver Schaefer, Berlin (DE); Guenter Baitz, Berlin (DE); Felix Neubert, Berlin (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 70 days.

This patent is subject to a terminal disclaimer.

(21) Appl. No.: 15/926,655

(22) Filed: Mar. 20, 2018

(65) Prior Publication Data

US 2018/0206657 A1 Jul. 26, 2018

Related U.S. Application Data

(63) Continuation of application No. 15/296,990, filed on Oct. 18, 2016, now Pat. No. 9,949,580.

(30) Foreign Application Priority Data

Oct. 19, 2015 (EP) .................................... 15190452

(51) Int. Cl.
*A47F 9/04* (2006.01)
*B65G 57/10* (2006.01)
(Continued)

(52) U.S. Cl.
CPC ................ *A47F 9/04* (2013.01); *B65G 43/10* (2013.01); *B65G 47/71* (2013.01); *B65G 57/10* (2013.01);
(Continued)

(58) Field of Classification Search
CPC ... A47F 9/04; A47F 2009/041; G07G 1/0036; G07F 7/0609; B65G 47/71; B65G 47/10; B65G 57/10; B65G 43/10
See application file for complete search history.

(56) References Cited

U.S. PATENT DOCUMENTS

| | | | |
|---|---|---|---|
| 4,607,252 A | 8/1986 | Neri | |
| 5,256,864 A | 10/1993 | Rando et al. | |

(Continued)

FOREIGN PATENT DOCUMENTS

| | | | |
|---|---|---|---|
| DE | 202007000500 U1 | 3/2007 | |
| DE | 102007004680 A1 | 8/2008 | |

(Continued)

*Primary Examiner* — Mark J Beauchaine
(74) *Attorney, Agent, or Firm* — Black, McCuskey, Souers & Arbaugh, LPA

(57) ABSTRACT

A reception system for receiving objects comprises at least one reception device for receiving objects, a conveyor device, which has at least one conveyor belt section for conveying objects in a conveyance direction in the at least one reception device, and a sensor device, which is arranged on the at least one reception device, for detecting objects in the at least one reception device. It is provided in this case that the sensor device is designed to emit sensor signals along different signal paths over the reception device, to conclude a fill level of the reception device on the basis of an interaction of at least one of the sensor signals with objects conveyed into the reception device. In this manner, a reception system for receiving objects is provided, which enables further automation, in particular in the conveyance of objects into a reception device.

15 Claims, 19 Drawing Sheets

(51) Int. Cl.
*B65G 43/10* (2006.01)
*B65G 47/71* (2006.01)
*G07G 1/00* (2006.01)
*G07F 7/06* (2006.01)

(52) U.S. Cl.
CPC ......... *G07F 7/0609* (2013.01); *G07G 1/0036* (2013.01); *A47F 2009/041* (2013.01)

(56) References Cited

U.S. PATENT DOCUMENTS

| | | |
|---|---|---|
| 5,313,766 A | 5/1994 | Rimondi et al. |
| 9,949,580 B2 * | 4/2018 | Schaefer .................. A47F 9/04 |
| 2012/0187194 A1 | 7/2012 | Svetal et al. |
| 2013/0105272 A1 | 5/2013 | Widmaier |
| 2013/0235368 A1 | 9/2013 | Tornwall et al. |
| 2014/0061308 A1 | 3/2014 | Madej et al. |
| 2014/0129362 A1 | 5/2014 | Marquis et al. |
| 2014/0324613 A1 | 10/2014 | Edwards et al. |

FOREIGN PATENT DOCUMENTS

| | | |
|---|---|---|
| DE | 102004046597 A1 | 4/2016 |
| EP | 1998301 B1 | 10/2010 |
| WO | 9013873 A1 | 11/1990 |
| WO | 9746329 A1 | 12/1997 |

\* cited by examiner

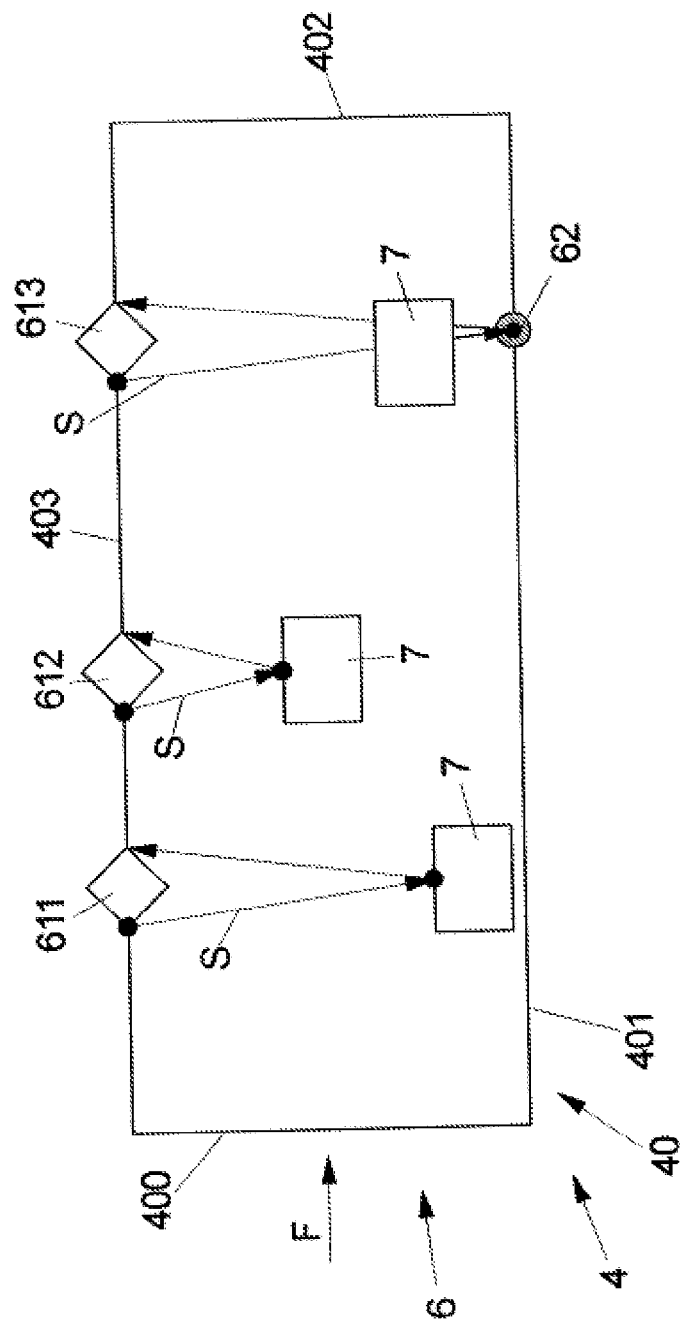

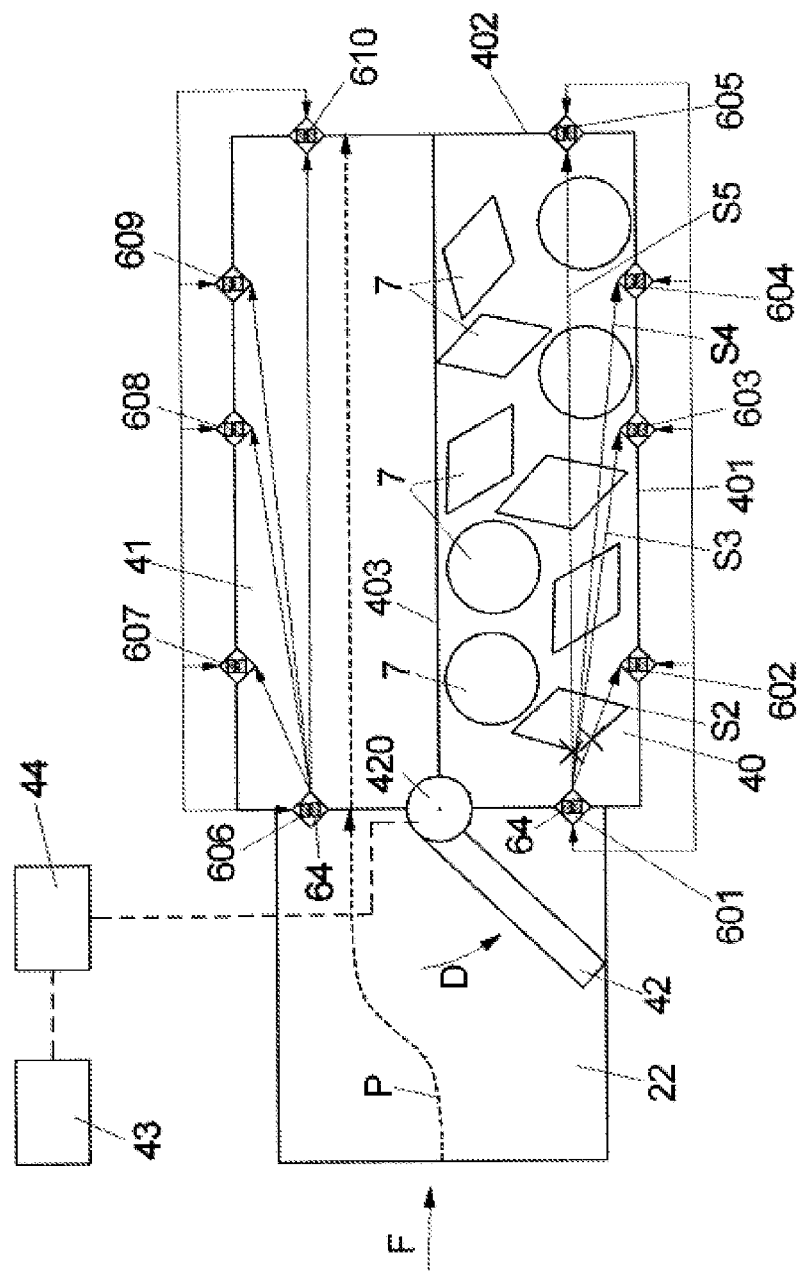

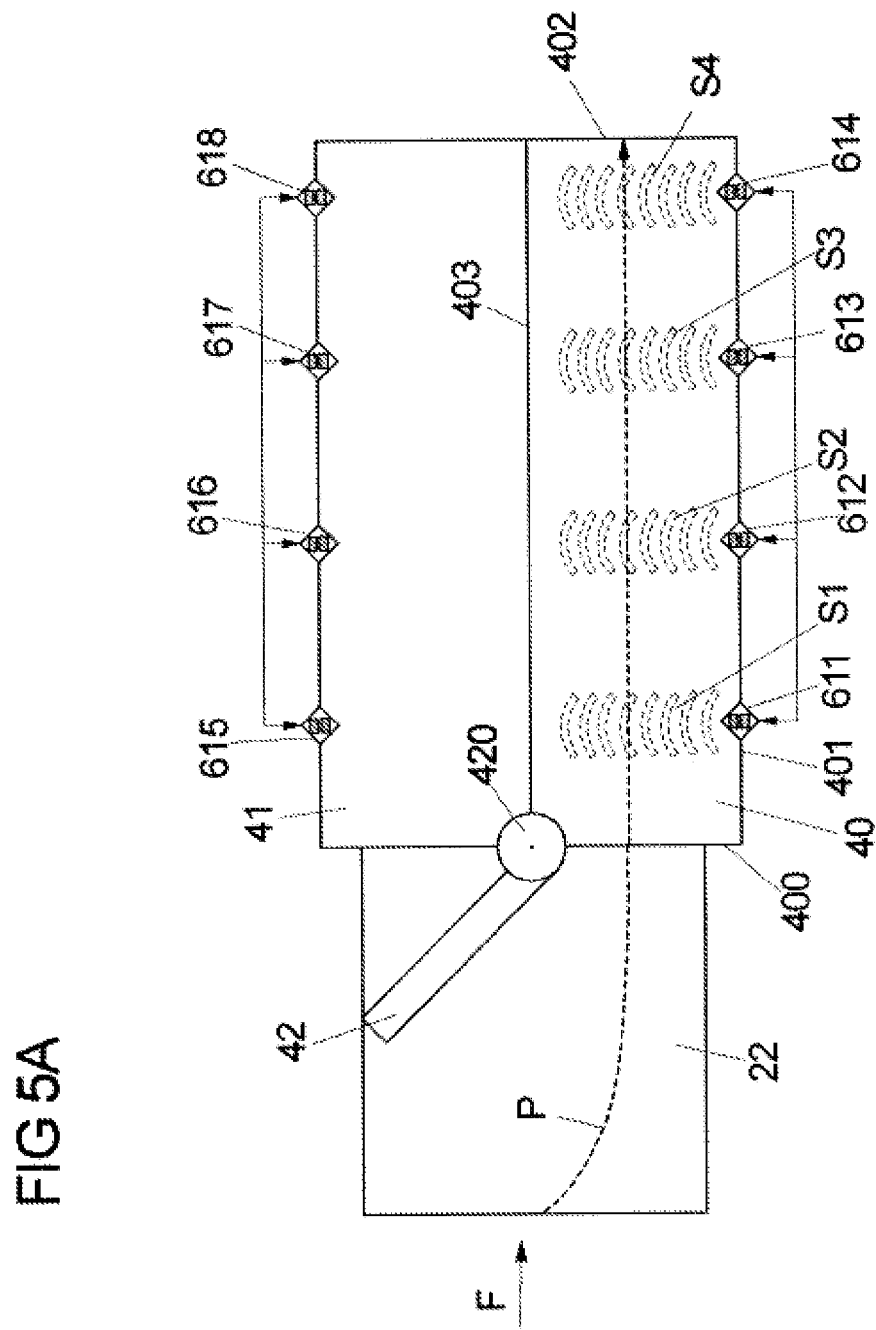

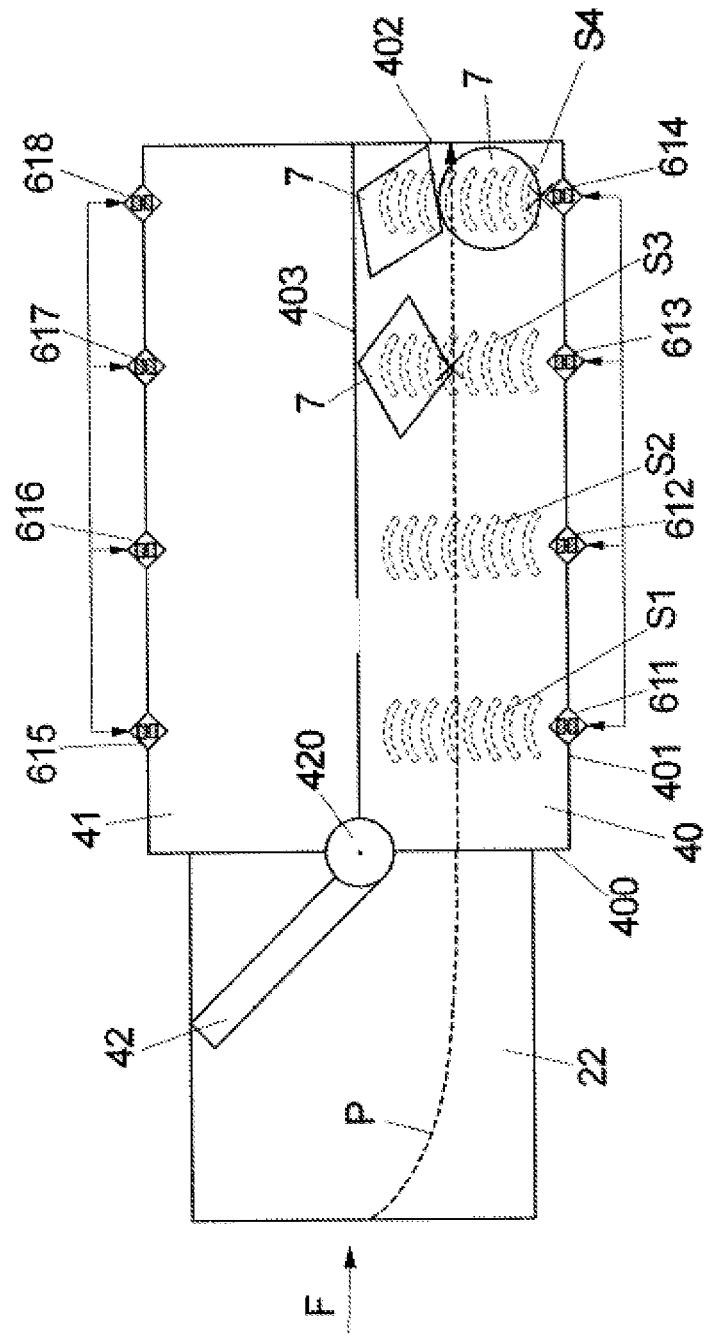

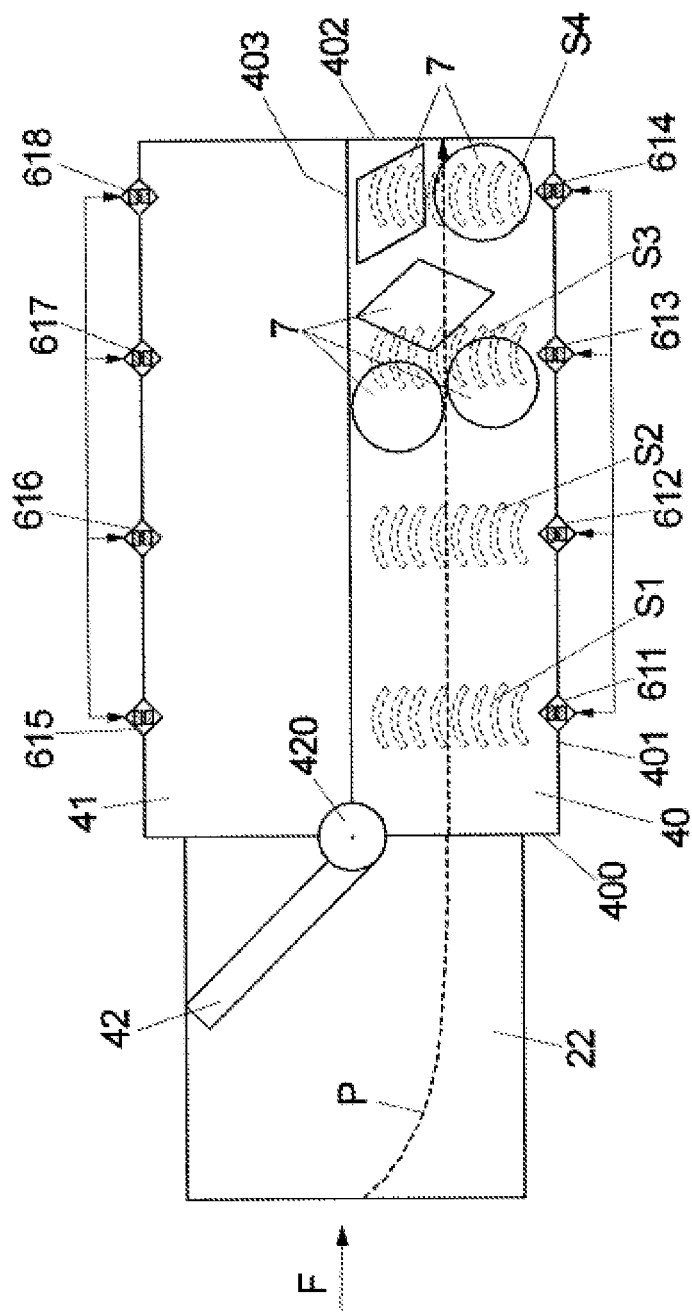

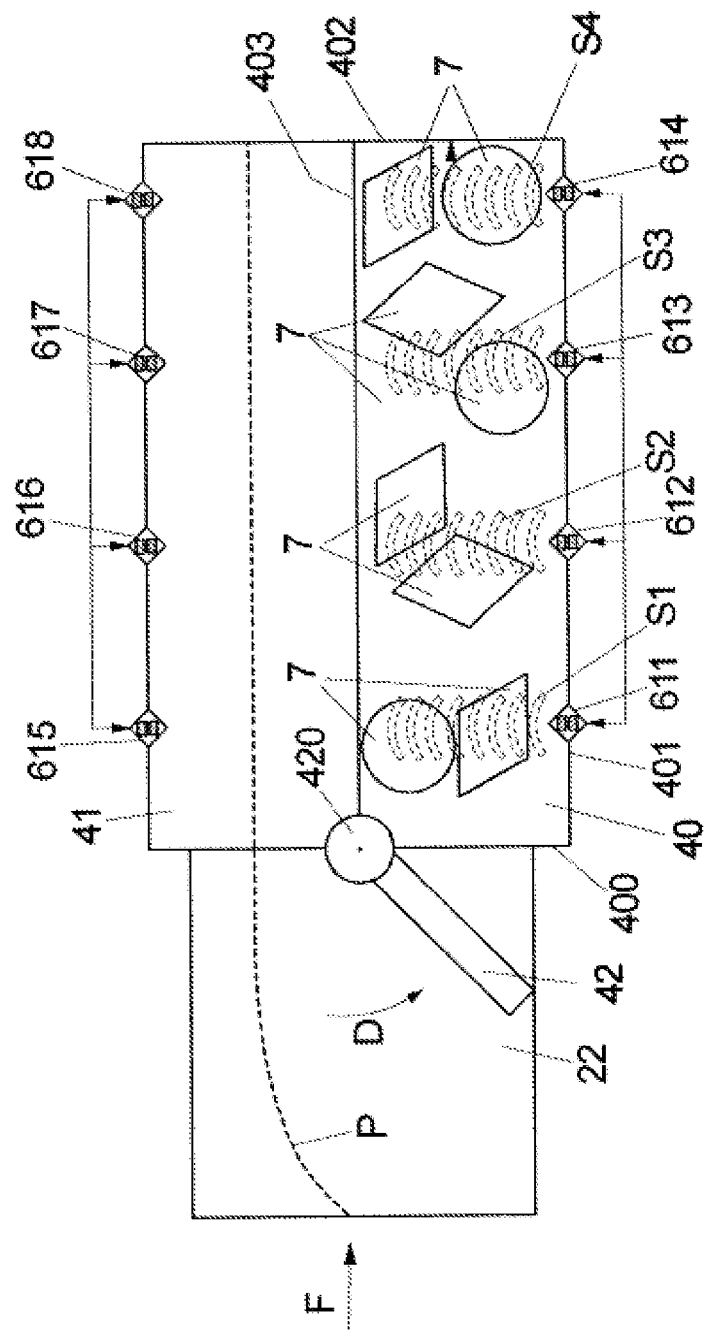

RECEPTION SYSTEM FOR RECEIVING OBJECTS

CROSS-REFERENCE TO RELATED APPLICATIONS

This patent application is a continuation application of prior-filed nonprovisional patent application Ser. No. 15/296,990.

This application claims priority to European Patent Application No. 15190452.1 filed on Oct. 19, 2015, the entirety of which is incorporated by reference herein.

BACKGROUND OF THE INVENTION

The invention relates to a reception system for receiving objects and a method for operating such a reception system.

Such a reception system can be designed, for example, as a packing trough system for a product checkout system. However, such a reception system can fundamentally also be designed, for example, as a reverse vending machine (RVM in short), in which containers in the form of beverage containers subject to deposit are collected, for example, on a bottle placement table in a reverse vending region.

Such a reception system for receiving objects comprises at least one reception device for receiving objects, a conveyor device, which has at least one conveyor belt section for conveying objects in a conveyor direction in the at least one reception device, and a sensor device, which is arranged on the at least one reception device, for detecting objects in the at least one reception device.

Reception devices exist, for example, in the form of product checkout systems, in which the detection and registration of products for payment can take place substantially automatically for a customer. Such a product checkout system, for example, at a supermarket cash register, comprises a conveyor device, on which a customer can place objects and which conveys the objects into the region of a scanning device. At the scanning device, the products are scanned and detected and registered, for example, on the basis of identification codes attached to the products, such as barcodes or the like. After passing the scanning device, the products are then conveyed into the region of a reception device in the form of a packing trough, from which the customer can remove the products and can pay at a payment device.

At such a reception system in the form of a product checkout system, the operation is to be made as simple as possible for a customer—if possible without assistance by operating personnel—and should be able to be performed intuitively. For this purpose, in conventional product checkout systems, for example, sensors are arranged on conveyor belt sections of the conveyor device, which detect whether, for example, products have been placed on a conveyor belt, so that depending thereon, the conveyor belt can be started and the products can be conveyed into the region of a scanning device.

In addition, the desire exists for further automation, for example, for those systems which comprise multiple reception devices and in which an object separation device, for example, in the form of a pivotable distributing guide, is to be adjusted to guide objects into one or the other reception device. Currently, such distributing guides are usually adjusted by hand by operating personnel, which process can be subject to error and requires additional operating steps.

BRIEF SUMMARY OF THE INVENTION

An object of the present invention is to provide a reception system for receiving objects and a method for operating such a reception system, which enable further automation, in particular when conveying objects into a reception device.

This object is achieved by a subject matter having the features as described herein.

The sensor device is accordingly designed to emit sensor signals along different signal paths over the reception device, in order to conclude a fill level of the reception device on the basis of an interaction of at least one of the sensor signals with objects conveyed in the reception device.

The present invention proceeds from the concept of measuring the fill level at a reception device by means of a sensor device. This is based on the concept that items of information can be obtained via the fill level, which can be used to control a reception system, for example, to control the conveyance speed of conveyor belt sections of the conveyor device or to adjust a distributing guide for guiding objects to different reception devices on the basis of the fill level.

To determine the fill level at a reception device, it is provided that the sensor device emits sensor signals along different signal paths over the reception device. The sensor device therefore spans the reception device at least in sections with a network of sensor signals, which interact with objects located in the reception device, for example, in that signal paths are interrupted and/or sensor signals are reflected or deflected. On the basis of interrupted signal paths or on the basis of reflected signals, a conclusion can then be drawn about the degree to which the reception device is filled, so that at least a (coarse) estimated value can be ascertained for the fill level of the reception device.

The sensor signals represent signals of infrared light, for example. The sensor device therefore emits, for example, by means of an infrared LED, infrared light along different signal paths and receives the infrared light at different receivers, for example, formed by photodiodes sensitive in the infrared, so that it can be detected on the basis of the received signal whether objects are located in the signal path of the infrared light or not.

In this context, it is to be noted that the sensor device can fundamentally also use other types of sensors, for example ultrasonic sensors, capacitive sensors, inductive sensors, pressure sensors, cameras, or the like, and is thus not restricted to sensors for emitting and/or receiving infrared light.

In one advantageous embodiment, the sensor device has a plurality of sensor units, which are arranged distributed about the reception device.

In a first variant, for this purpose, for example, one sensor can be provided which emits sensor signals. The sensor signals are received via a plurality of receivers arranged distributed about the reception device, wherein the emitter can emit identical sensor signals, so that each receiver receives the same sensor signal, or the emitter can also emit individual sensor signals, which are each uniquely assigned to one receiver, so that each receiver receives an individual sensor signal uniquely assigned thereto.

In a second variant, a plurality of emitters can also be provided for emitting sensor signals, wherein these sensor signals are received by a shared receiver. In this case, the sensor signals emitted by the different emitters can differ from one another, so that the receiver can differentiate the sensor signals of the different emitters and can associate each of them uniquely with an assigned emitter. In another variant, it is also possible that the individual emitters emit sequentially in a chronologically staggered manner, for example in short cycles, so that the receiver always only receives one signal from a single emitter at a specific point in time.

A combination of the first and the second variants is also conceivable and possible for this purpose. Thus, a plurality of emitters and a plurality of receivers can be provided, wherein each emitter emits a plurality of sensor signals, which are received by a plurality of receivers, so that one emitter emits sensor signals to multiple receivers and one receiver receives sensor signals from multiple emitters.

Because emitters and receivers are distributed around the reception device, the reception device can be spanned with a network of signal paths. In a state in which the reception device is empty, the sensor signals can propagate unobstructed between the emitters and the receivers and are received at the receivers. However, if objects are located in the reception device, at least some of the signal paths are thus interrupted or (significantly) damped (for example, at edges or on transparent objects) or are even amplified under certain circumstances (due to bundling of the light signal, for example on transparent objects as a result of a lens effect, for example on curved surfaces), so that all sensor signals are no longer received at all receivers or at least a deviation in the received signal strength from an expected signal strength occurs, which can be analyzed accordingly to determine the fill level.

A reception device is, in one specific embodiment, bordered by wall sections, which are arranged in a box shape in relation to one another, for example, to form a rectangular reception device. Sensor units of the sensor device are arranged spatially offset on these wall sections, so that different signal paths are formed between the different sensor units, along which sensor signals are transmitted.

In one concrete exemplary embodiment, a first sensor unit, which forms an emitter, can be arranged on a first wall section of the at least one reception device, and a second sensor unit, which forms a receiver, can be arranged on a second wall section, which is opposite to the first wall section, such that the second sensor unit is opposite to the first sensor unit. The first sensor unit therefore emits a sensor signal from the first wall section in the direction of the second sensor unit on the opposing, second wall section. If the sensor signal is received at the second sensor unit, this means that no products are located between the first sensor unit and the second sensor unit in the reception device. In contrast, if the signal path is interrupted by a product and accordingly no sensor signal is received at the second sensor unit, it can thus be concluded that the reception device is filled (at least) up to the signal path between the first sensor unit and the second sensor unit.

The opposing arrangement of sensor units corresponds to an arrangement similar to a light barrier. It is conceivable and possible in this case that both sensor units both emit sensor signals and also receive sensor signals, so that signals are emitted both from the first sensor unit toward the second sensor unit and also, vice versa, signals are emitted from the second sensor unit toward the first sensor unit.

In principle, signal paths can extend in a direct optical connection between an emitter and a receiver. However, it is also conceivable and possible in this case that a signal path forms via a reflection point (or multiple reflection points), in that a sensor signal is emitted by an emitter, reflected at a reflection point, and only then received by a receiver.

It is additionally conceivable and possible that a sensor unit is designed as a reflection sensor for emitting a sensor signal and for receiving a reflected signal. A separate, spatially separated receiver is therefore not assigned to the emitter, but rather the sensor unit is designed to emit sensor signals and to detect possibly reflected signal components. By means of such reflection sensors, not only can it be ascertained (in the manner of a light barrier), whether a signal path is interrupted, but rather the reflected signals per se can be studied with respect to the signal strength thereof, for example, to conclude the distance to an object at which the sensor signal has been reflected, for example.

For example, signals reflected at such a reflection sensor can be assigned to a short range and a long range of the sensor. The signal level of a received reflected signal can thus be compared to different threshold values, to determine on the basis of this threshold value comparison whether an object at which the sensor signal has been reflected is located at short range or long range to the sensor. If the signal level of the received reflected signal exceeds a first threshold value assigned to the short range of the sensor, for example, it can be concluded therefrom that the reflected object is located at the short range to the sensor. In contrast, if the signal level of the reflected signal is between the first threshold value and a second, lower threshold value, it can be concluded therefrom that the reflective object is located at long range to the sensor. If the reflected signal is weaker than the second threshold value, it can thus be presumed that it is not a signal reflected on an object, but rather an interference signal or the like.

Sensors in the form of ultrasonic sensors can advantageously be used for the measurement and analysis of reflection signals, in the case of which different reflection properties of objects only play a subordinate role. The measurement and analysis of such reflection signals using other sensors is also fundamentally conceivable and possible, however.

Such a reflection measurement can additionally be used, for example, in a reception system in the scope of a reverse vending machine, in which it is to be ascertained at a reception device, for example, to what extent the reception device is filled with containers in the form of bottles or cans. Bottles, for example, have at least approximately similar reflection properties, so that the distance to a sensor can be concluded on the basis of the strength of different reflection signals (an assignment to a short range or long range can at least be performed).

It is also conceivable and possible in one embodiment that the reception system has at least one sensor unit, which is designed as a reflection sensor for emitting a sensor signal and for receiving a reflected signal and is additionally designed for receiving an emitted signal of another sensor device. The sensor unit is therefore, on the one hand, a reflection sensor but is also used, on the other hand, as a receiving sensor unit, for example, in the scope of a one-way light barrier, in which a sensor signal is emitted by a sensor unit and is received by another sensor unit. In this manner, on the one hand, it can be recognized in the scope of a light barrier function whether an object is arranged at all on a route between an emitting sensor unit and a receiving sensor unit. In addition, an item of distance information can also be obtained by the reflection sensor, so that it can be determined at which location (approximately) the object is located on this route.

The reception system for example comprises a control device, which is connected to the different sensor units of the sensor device and controls the operation of the sensor units. The analysis device thus activates the sensor units of the sensor device to emit sensor signals and receives sensor data from the sensor units, which have been obtained on the basis of received (or non-received) sensor signals. The control device can then perform an analysis on the basis of the sensor data, to conclude the fill level of the reception device.

For example, if a signal path between an emitter and a receiver is interrupted by an object located on the reception device and accordingly, when the emitter emits a sensor signal, no sensor signal is received at the assigned receiver, this can thus be analyzed accordingly. Because the positions of the sensor units on the reception device are known and therefore the signal paths between the different emitters and receivers are also known, the fill level can be concluded from the interruption of one or more signal paths or from the reception of reflected signals from different regions of the reception device, so that at least an estimated value can be specified for the fill level.

For example, it can be ascertained by suitable sensor distribution whether the reception device is empty, 25% filled, 50% filled, 75% filled, or full (100% filled). Fill level ranges of the reception device are thus differentiated on the basis of the signal paths, so that successive filling of the reception device with objects can be monitored.

A control of the reception system can be performed on the basis of the fill level. Thus, the conveyance speeds of one or more conveyor belt sections of the conveyor device can be adapted as a function of the fill level. If it is established in this case that a reception device is nearly full, the conveyance speed of a conveyor belt section which conveys objects into the reception device can thus be reduced, to reduce the speed at which objects are guided into the reception device. It is also conceivable to start another conveyor belt section, to enable the guiding of objects toward another reception device.

It is also conceivable that an object separation device in the form of a distributing guide on the reception device is controlled as a function of the fill level. The control device can thus be designed to activate a drive device for adjusting the object separation device as a function of an ascertained fill level, for example if it is recognized that the reception device is nearly full and therefore objects are to be guided into another reception device. The object separation device in the form of the distributing guide can be arranged so it is pivotable on the reception device, for example. If it is recognized that the reception device is full or at least nearly full, the object separation device is thus pivoted and therefore the conveyor path toward the reception device is blocked, to guide objects along the object separation device toward another reception device.

In addition, the control device can be designed to output items of information to a user about the fill level at a reception device. The user can thus be informed, for example, about whether a reception device is completely full, nearly full, or empty. Additionally or alternatively, it can be output via the control device whether a reception device, for example, a packing trough in a packing trough system, is occupied by a customer or is free.

In addition, it is possible to select a reception device automatically by means of the control device. Thus, the control device, for example in the case of a packing trough system, in which multiple packing troughs, for example more than two packing troughs, are present, can automatically select a new packing trough when a previously used packing trough is full and is therefore not ready to receive further objects.

A scenario for providing an intelligent reception device is also conceivable, for example an intelligent packing trough, in which objects are intentionally guided to a location, at which a user removes objects from the reception device, by means of a suitable conveyor device. Such a location can be detected by the sensors, for example, because a free region results at this location in the reception device, which can be detected by sensors. If this is the case, one or more conveyor devices on the reception device can be activated in a targeted manner to feed objects toward this free region. This is advantageously usable for example in a packing trough system, in which a user removes products from a packing trough.

In the case of a reception system for a reverse vending machine, for example, it is conceivable and possible to adapt dynamic sorting subregions as a function of the fill level, thus to make them wider or narrower. A statement can also be made if necessary about containers of one bottle type located in a sorting region, so that users are informed beforehand about how many bottles are available in a specific sorting region, so that beverage crates can be provided in a suitable number, for example.

In one advantageous embodiment, the sensor units of the sensor device each have a display device, for example in the form of one or more LEDs, for outputting visual display signals as a function of a fill level of the reception device. If a reception device is ready to receive objects, the sensor units of the sensor device can thus light up green at the reception device, for example, to signal the readiness of the reception device. If the fill level of the reception device has exceeded a predetermined threshold value, the display device can thus change its color from green to orange, so that it is signaled to a user and also the operating personnel that the reception device is approaching its full state. If one switches over to another reception device by adjusting the object separation device, the display devices of the sensor units can thus change their color to red, to indicate that the reception device is not ready to receive objects.

In a further advantageous embodiment, it can be provided that sensor units of the sensor device mutually identify one another. For this purpose, signals can be exchanged between the sensor units, for example, in a chronologically staggered manner, by way of which the sensor units can mutually recognize whether and in what number and at which location other sensor units are provided. For example, a sensor unit designed as an emitter can emit a sensor signal which contains an identification identifier which identifies the emitter, for example in the form of a digital bit sequence or the like, and is used as a test signal. The sensor signal can be received by a receiver, so that the emitter can be identified at the receiver and it can be recognized that an exchange of sensor signals is possible between the emitter and the receiver in the correct manner.

An identifying signal can be, for example, a simple bit sequence, for example comprising five pulses having different high or low values (1 and 0). However, an identifying signal can also be an address identifier, for example, the MAC address or a dynamically assigned ID, for example.

Such identifying sensor signals can be exchanged in this case between all emitters and receivers, so that the sensor units receive items of information via each of the signals, for example about the distance and visibility (optionally also via reflection points) of other sensor units. In this case, a unique identification identifier can be assigned to each emitter, which is transmitted in the scope of the exchanged sensor signals, so that an emitter can uniquely identify itself in relation to a receiver. However, this is not required.

Such a recognition of the sensor units among one another can optionally also take place indirectly, for example so that a first sensor unit recognizes another, second sensor unit via an interposed third sensor unit, which transmits signals between the first and the second sensor units in an intermediary manner.

Such a mutual identification can be carried out in a calibration pass before the actual operation, to teach the system. In addition, however, it can also be provided that identification identifiers are always exchanged repeatedly in operation between the different emitters and receivers, so that the operational readiness of the system can be checked in a repetitive manner.

This procedure also makes it possible to recognize soiling or manipulation attempts on the system. The sensor device can thus be designed to analyze a test signal received at a receiver and to compare the signal level of this test signal to a stored reference value. A change at the sensor device can then be concluded on the basis of the comparison. If the receiver is soiled, for example, and the signal level of the received test signal is thus lower, this can thus be recognized accordingly. The signal level of the test signal will also change (increase or decrease), if the position of the receiver is changed in relation to the emitter, which can also be recognized accordingly on the basis of the comparison to the reference value.

A degree of soiling can be recognized on the basis of different threshold value steps, for example. A gradually occurring soiling can be learned in this case by way of a cyclic query in running operation and therefore can be taken into consideration or can trigger a readjustment. It can be differentiated therefrom whether a manipulation takes place on a sensor unit, because in this case a sudden change occurs, for example in the signal strength or the signal runtime (for example, in the case of ultrasonic signals).

Cleaning of sensors can be executed, for example, by starting a cleaning program in a system menu.

The reference value can be initially determined in this case, for example by calibration before putting into operation on the basis of the received signal level in the starting state. If deviations from this reference signal level result in later operation, this indicates a change on the system.

In one embodiment, a product checkout system has a reception system of the above-described type. In such a product checkout system, the reception system can be embodied, for example, by a packing trough system having one or more packing troughs. The reception system can contain in this case, for example, a scanning device for (automatically) scanning and registering objects. By means of the conveyor device, objects are guided past the scanning device, registered therein, and guided toward a reception device in the form of one or more packing troughs of the reception system.

However, it is also conceivable and possible that the reception system is a component of a reverse vending machine, in which a user introduces an object subject to deposit and the reception system is used to collect introduced objects subject to deposit.

The object is also achieved by a method for operating a reception system for a reception system. In the method, at least one reception device receives objects, in that a conveyor device having at least one conveyor belt section conveys objects in a conveyance direction into the at least one reception device. A sensor device, which is arranged on the at least one reception device, detects objects in the at least one reception device. It is provided in this case that the sensor device emits sensor signals along different signal paths over the reception device, to conclude a fill level of the reception device on the basis of an interaction of at least one of the sensor signals with the objects conveyed into the reception device.

Advantages and advantageous embodiments, as have been described above for the reception system, are also applied similarly for the method, so that reference is made to the above statements.

BRIEF DESCRIPTION OF THE SEVERAL VIEWS OF THE DRAWING(S)

The concept on which the invention is based will be explained in greater detail hereafter on the basis of the exemplary embodiments illustrated in the figures.

FIG. 3 shows a schematic view of another exemplary embodiment of a packing trough having a sensor device arranged thereon.

FIGS. 4A-4E show views of an exemplary embodiment of a packing trough system, during filling of a packing trough.

FIGS. 5A-5D show views of another exemplary embodiment of a packing trough system, during filling of a packing trough.

DETAILED DESCRIPTION OF THE INVENTION

A reception system is described hereafter on the basis of exemplary embodiments of a packing trough system in a product checkout system. However, this is to be understood solely as an example. Fundamentally, a reception system of the type described here can also be used in other systems, for example in reverse vending machines or monitoring systems, in which a fill level is to be monitored on a (planar) reception device for receiving objects.

Figure 1:
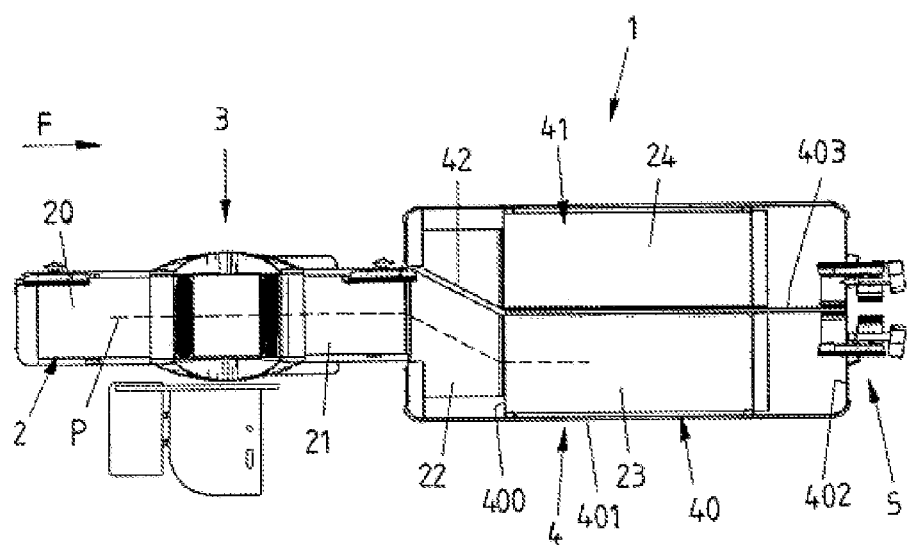
FIG. 1 shows a top view of one exemplary embodiment of a product checkout system.

FIG. 1 shows a schematic top view of an exemplary embodiment of a product checkout system 1, which can be used, for example, at a supermarket cash register for detecting and registering products for payment by a customer.

The product checkout system 1 has a conveyor device 2 having multiple conveyor belt sections 20, 21, 22, 23, 24. A customer can place products on a first conveyor belt section 20 in this case. Via this first conveyor belt section 20, the products are conveyed through a scanning device 3, to detect the products automatically in the scanning device 3 and, for example, to register them on the basis of bar codes attached to the products. From the first conveyor belt section 20, the products arrive on a second conveyor belt section 21 and, along a conveyor path P, via a third conveyor belt section 22, on a conveyor belt section 23, which is assigned to a packing trough 40 of a packing trough system 4. The products collect in the packing trough 40, so that the products can in turn be removed by the customer and can be packaged to be carried, for example. Finally, the customer can pay for the products at a payment device 5.

The packing trough system 4 has multiple packing troughs 40, 41 (in the illustrated exemplary embodiment two packing troughs 40, 41). The packing troughs 40, 41 are separated from one another by a product separation device 42 in the form of a product distributing guide, wherein this product distributing guide 42 can be adjusted to guide the products into one or the other packing trough 40, 41.

In the product checkout system 1, the products are conveyed in a conveyance direction F through the scanning device 3 to a respective reception-ready packing trough 40, 41. The receiving packing trough 40, 41 is filled successively until all products of a customer have been registered and supplied to the packing trough 40, 41. The product separation device 42 is thereupon rearranged so that subsequent products of another customer are guided toward another packing trough 40, 41.

During filling of a packing trough 40, 41, it may occur that the packing trough 40, 41 reaches its maximally filled state, for example because the speed at which the products are conveyed into the packing trough 40, 41 is greater than the speed at which a customer removes products from the packing trough 40, 41. If this is not recognized, a further conveyance of products toward the packing trough 40, 41 can occur, although the packing trough 40, 41 is actually full, which can result in a backup of products on the conveyor device 2.

To enable a control of the product checkout system 1 as a function of the fill level of the packing trough 40, 41, in the present case, a sensor device 6 is therefore arranged on the packing trough 40, 41, which is used to monitor the fill level of the packing trough 40, 41.

Figure 2:
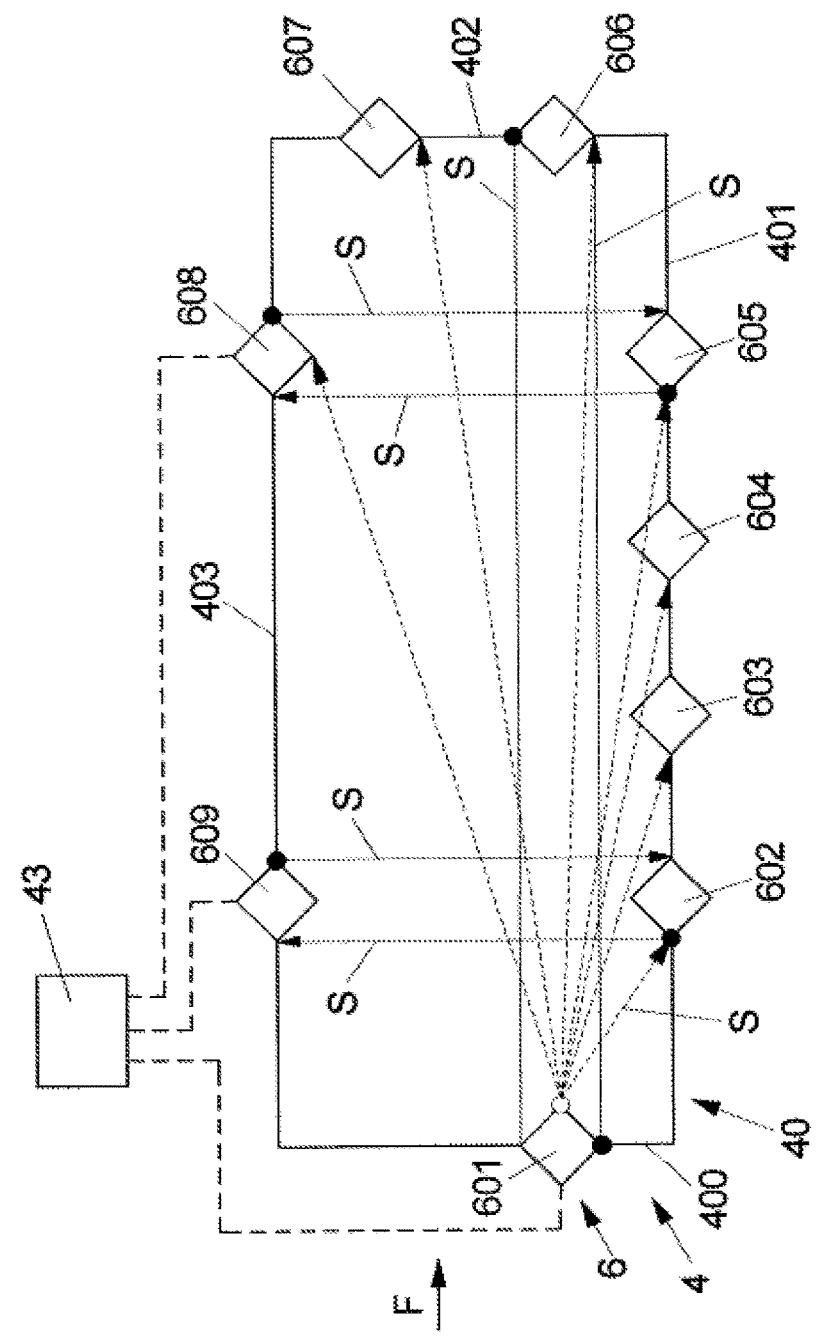
FIG. 2 shows a schematic view of a packing trough having a sensor device arranged thereon.

FIG. 2 shows a first exemplary embodiment of such a sensor device 6 on a packing trough 40 of a packing trough system 4. In the sensor device 6, a plurality of sensor units 601-609 are arranged on different wall sections 400-403 of the packing trough 40, spatially distributed around the packing trough 40. The wall sections 400-403 delimit the packing trough 40 in a box shape and therefore represent outer walls of the packing trough 40.

In the illustrated exemplary embodiment, sensor units 601-609 are provided, which emit sensor signals S along different signal paths over the packing trough 40 and therefore span the packing trough 40 at least in sections with a network of signal paths. The sensor units 601-609 can be used in this case as an emitter and/or as a receiver and are therefore designed for emitting sensor signals S and/or for receiving sensor signals S.

In the illustrated exemplary embodiment, the sensor 601, which is arranged on the front wall section 400—observed along the conveyance direction F—of the packing trough 40 emits sensor signals S, which are received by multiple sensor units 602-608 designed as receivers. The sensor 601 can emit identical sensor signals S in this case, so that each receiving sensor 602-608 receives the same sensor signal S. Alternatively, it is conceivable that the sensor 601 emits different sensor signals S, wherein an individual sensor signal S is uniquely assigned to each receiver 602-608.

In addition, in the exemplary embodiment according to FIG. 2, pairs of sensor units 601-609 are formed, which mutually transmit sensor signals S. Thus, the sensor 606 is assigned to the sensor 601, wherein the sensors 601, 606 each emit a sensor signal S and receive the sensor signal S emitted from the respective other sensor 606, 601. The sensor units 601, 606 are located opposite to one another in this case, on opposing wall sections 400, 402.

In addition, the sensor 609 is assigned to the sensor 602 and the sensor 608 is assigned to the sensor 605. The sensors 602, 609 or 605, 608, respectively, are opposite to one another in pairs on the wall sections 401, 403 and exchange sensor signals S in pairs, so that each sensor 602, 609, 605, 608 emits a sensor signal S which is received by the respective other sensor 609, 602, 608, 605 and vice versa.

Another exemplary embodiment is shown in FIG. 3. In this exemplary embodiment, three sensors 611, 612, 613, which are embodied as reflection sensors, are arranged on a wall section 403 of the packing trough 40. The sensors 611-613 each emit a sensor signal S, which is reflected on a product object 7 located in the packing trough 40 (in the case of the sensors 611, 612) or on the opposing wall 401 (in the case of the sensor 613). In the case of the sensors 611, 612, the presence and if necessary also the distance of a product object 7 in the packing trough 40 can be concluded by analyzing the reflected signal components received at the sensors 611, 612. In the case of the sensor 613, it can be recognized whether a product object 7 interrupts the signal path between the sensor 613 and the opposing reflection point 62, to conclude the presence of a product object 7 on the basis of this interruption.

The sensors 611, 612 are so-called reflection scanners, which analyze the reflection on the product object 7 themselves. By analyzing whether a reflected signal is received at the sensor 611, 612, the presence of a product object 7 can therefore be concluded.

The sensor 613, in contrast, is a reflection light barrier, which analyzes whether a light beam reflected at a reflection point 62 is interrupted by a product object 7. In this case, for example, it can be differentiated whether a reflected signal received at the sensor 613 has been caused by a reflection on the product object 7 or on the reflection point 62, in that a polarization of the reflected signal takes place on the reflection point 62.

The functionality for detecting a fill level will be explained hereafter on the basis of FIGS. 4A to 4E for the exemplary embodiment according to FIG. 2 and on the basis of FIGS. 5A to 5D for the exemplary embodiment according to FIG. 3.

In the exemplary embodiment according to FIGS. 4A to 4E, a plurality of sensor units 601-610 are arranged on each of two adjacent packing troughs 40, 41 of a packing trough 4. This exemplary embodiment is simplified in this case in relation to the exemplary embodiment according to FIG. 2 such that one sensor unit 601, 606 is used as the emitter of sensor signals S for each packing trough 40, 41, while the remaining sensor units 602-605 or 607-610, respectively, are used as receivers. By means of the signal paths S2-S5 formed between the different sensor units 601-610, each packing trough 40, 41 is spanned at least in sections like a network, to conclude the fill level of the respective packing trough 40, 41 on the basis of an interaction of product objects 7 with the sensor signals S.

Figure 4A:
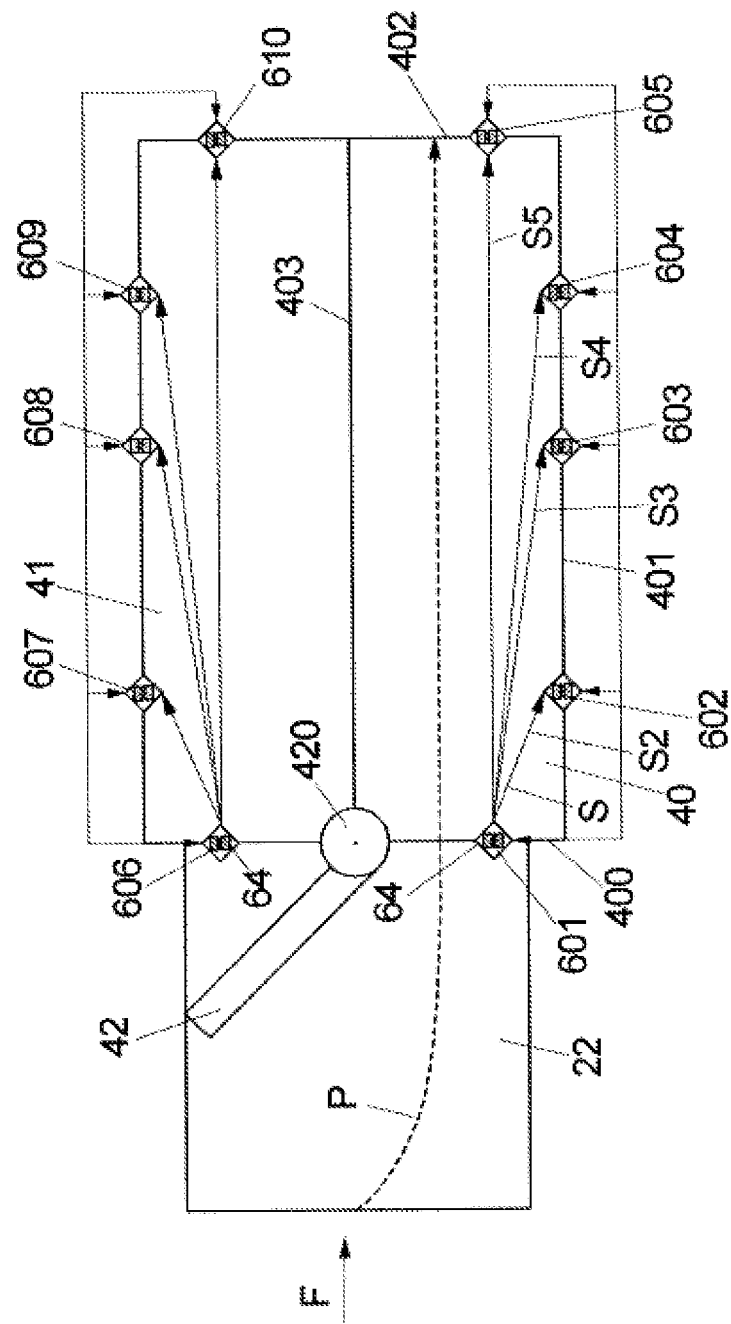

In the starting state according to FIG. 4A, the product separation device 42, which is arranged so it is pivotable about a pivot axis 420 on the wall 403 separating the packing troughs 40, 41, is located in a position in which the lower packing trough 40 in FIG. 4A is accessible, but the adjacent, other packing trough 41 is blocked in the conveyance direction F. Therefore, products which are conveyed via the conveyor section 22 toward the packing troughs 40, 41 strike the product separation device 42 and are guided toward the packing trough 40 and therefore conveyed into the packing trough 40.

In the starting state according to FIG. 4A, the packing trough 40 is empty. No product objects 7 are located in the packing trough 40. Accordingly, the sensor signals S emitted by the sensor 601, which is used as the emitter, are received by the sensor units 602-605, which are used as receivers. The signal paths S2-S5 formed between the sensor units 601-605 are not interrupted.

Figure 4B:
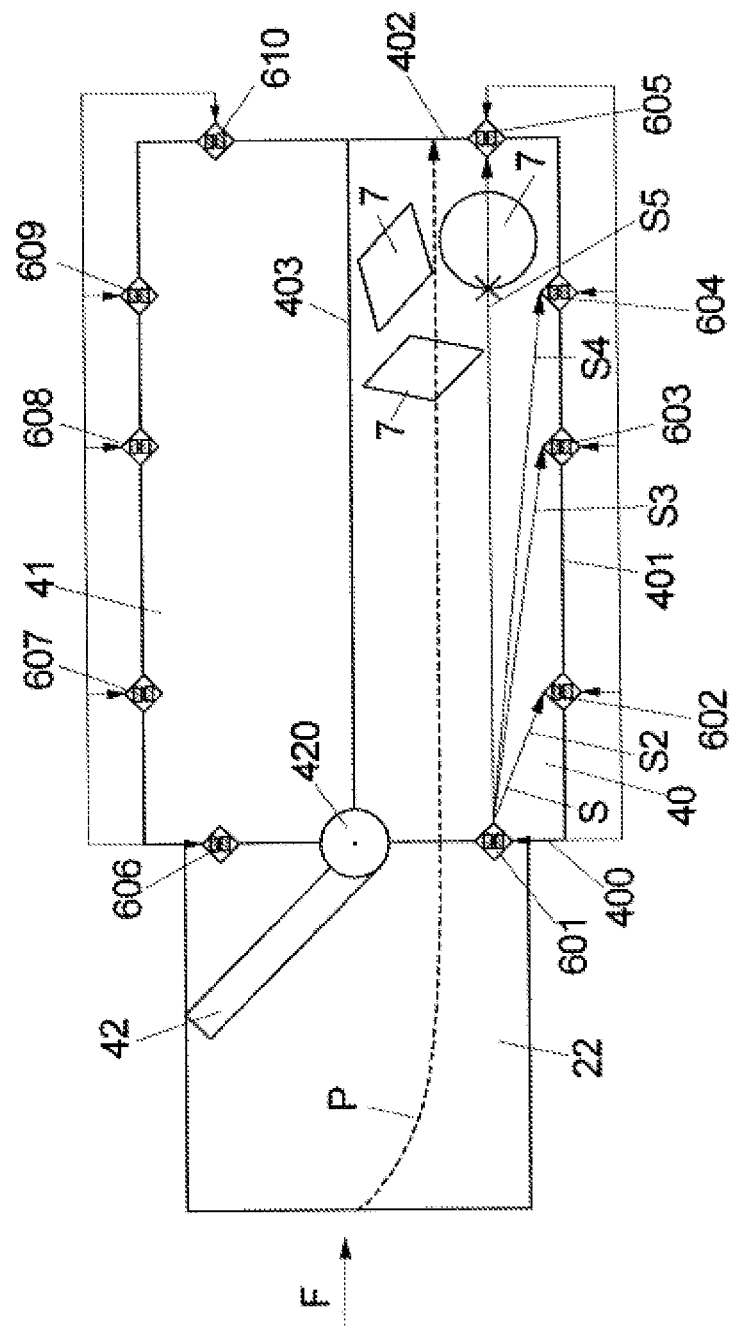

If the packing trough 40 fills, because products 7 are conveyed into the packing trough 40, as shown in FIG. 4B, firstly the signal path S5 formed between the sensor unit 601 and the opposing sensor 605 is interrupted. The sensor units 601-610, as schematically illustrated in FIG. 2, are connected to a control device 43, which generates sensor data on the basis of the sensor signals S received at the sensor units 602-605 and analyzes these data for the fill level determination. If it is determined by means of the control device 43 that signal path S5 is interrupted (but not the remaining signal paths S2-S4), it is thus concluded that the packing trough 40 is filled approximately 25%.

Figure 4C:
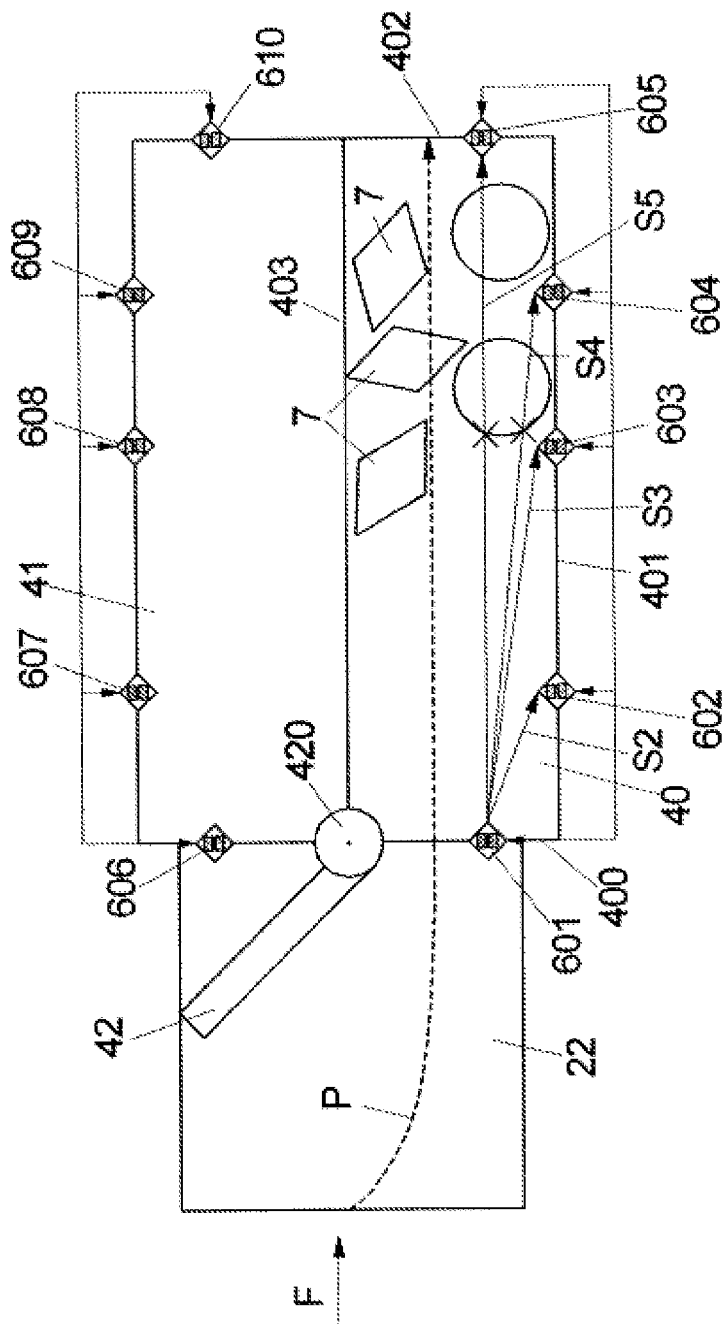

If the packing trough 40 fills further, as shown in FIG. 4C, the signal path S4 between the sensor unit 601 used as the emitter and the sensor 604 used as the receiver is thus next interrupted, which is recognized and analyzed by the control device 43. The control device 43 concludes therefrom that the packing trough 40 is approximately 50% filled.

Figure 4D:
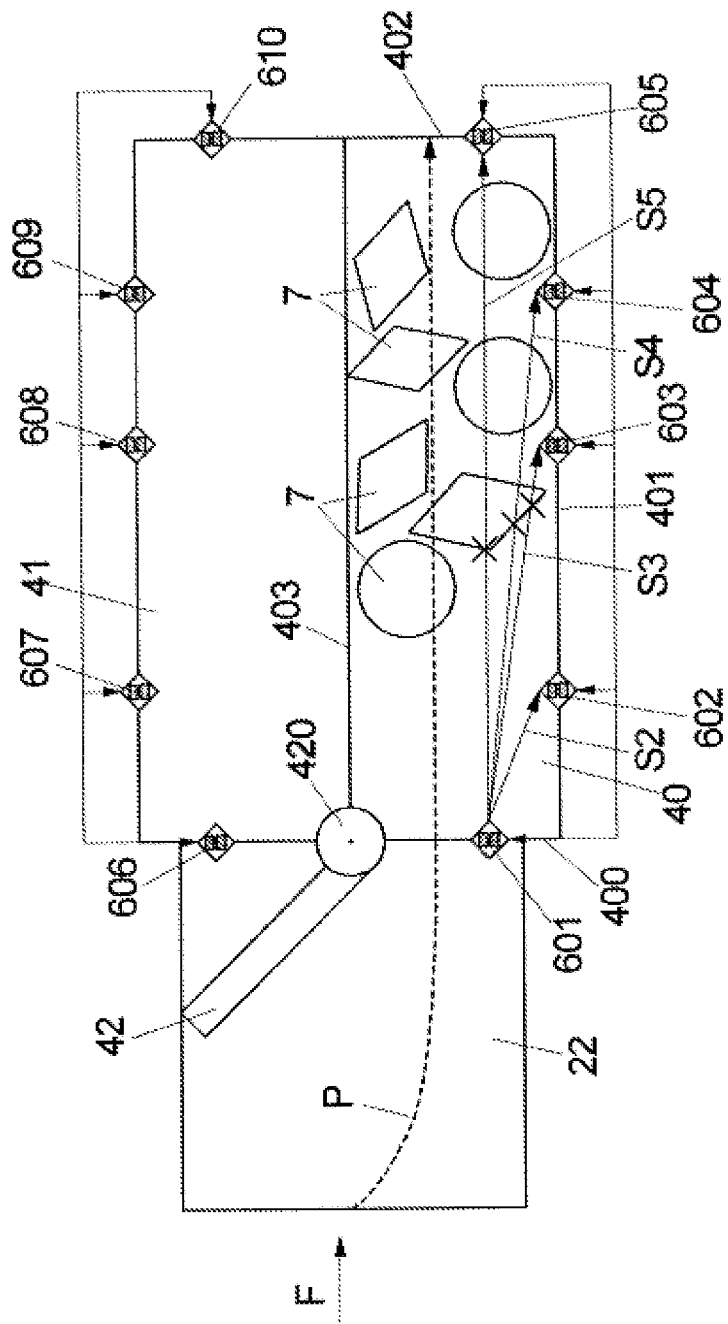

If the packing trough 40 fills further, the signal path S3 between the sensor unit 601 and the sensor unit 603 is thus interrupted next, as shown in FIG. 4D, from which the control device 43 concludes that the packing trough 40 is approximately 75% filled.

Finally, as shown in FIG. 4E, the signal path S2 between the sensor unit 601 and the sensor unit 602 is also interrupted, from which the control device 43 concludes that the packing trough is 100% filled.

In the filled state according to FIG. 4E, all signal paths S2-S5 are interrupted. At the fill level of 75% (FIG. 4D), the signal paths S3-S5 are interrupted; at the fill level of 50% (FIG. 4C), the signal paths S4 and S5 are interrupted. In order that a specific fill level is recognized, it is necessary for all preceding signal paths (for example, for the fill level 75%, in addition to the signal path S3, also the preceding signal paths S4, S5) to be interrupted. In this manner, a differentiation is made between a (brief) interruption of a signal path S2-S5 when conveying a product object 7 into the packing trough 40 and the actual successive filling of the packing trough 40.

The recognition of the fill level can be used for a control of the conveyor device 2. Thus, it can be provided that the conveyance speed of the conveyor belt section 22 and also other conveyor belt sections 20, 21, 23, 24 is controlled as a function of the fill level of the packing trough 40. It can thus be provided that the conveyance speed of the conveyor belt section 22 is set to a maximum in the case of empty packing trough 40 (FIG. 4A) and in the case of 25% filled packing trough 40 (FIG. 4B). If the fill level of 50% (FIG. 4C) is reached, the control device 43 can activate the conveyor belt section 22 to reduce the conveyance speed, so that the conveyor belt section 22 is now only driven at half conveyance speed, for example. If the packing trough 40 is full (FIG. 4E), the conveyor belt section 42 can finally be stopped.

In addition, the product separation device 42 can also be activated as a function of the fill level. It can thus be provided, as shown in FIG. 4E, that in the case of full packing trough 40, the control device 43 activates a drive device 44 of the product separation device 42, to pivot the product separation device 42 about the pivot axis 420 and therefore block the packing trough 40 and to make the other, adjacent packing trough 41 accessible for receiving products. Products conveyed via the conveyor belt section 22 are therefore guided into the packing trough 41 along the conveyance path P, which is now oriented into the packing trough 41.

Display devices 64 in the form of light-emitting diodes or the like can be provided on the sensor units 601-610 (see FIG. 4A). These display devices 64 can be used to display different states of the packing troughs 40, 41.

The sensor units 601-610 can additionally or alternatively also be connected to external display devices, via which signaling can be performed. In addition, it is also possible to perform signaling spatially separated from the sensor units 601-610, for example, in that suitable actuators are activated or signaling is performed via a central control unit, for example a display screen of the central control unit.

It can thus be provided that in the state according to FIG. 4A, the display devices 64 at the sensor units 601-605 of the packing trough 40 light up green to signal that the packing trough 40 is ready to receive products. In contrast, the display devices 64 at the other packing trough 41 can light up red, for example, to indicate that no products can be conveyed into this packing trough 41. If the packing trough 40 fills up to the fill level of 75%, for example, (FIG. 4D), the display devices 64 of the sensor units 601-605 of the packing trough 40 can thus change their color from green to orange, to indicate that the packing trough 40 has filled to a large extent. Finally, if the packing trough 40 is full (FIG. 4E), the display devices 64 of the sensor units 601-605 of the packing trough 40 can thus change their color to red, while the display devices 64 of the sensor units 606-610 of the packing trough 41 switch to green, to now indicate that the packing trough 41 is ready to receive products.

The assignment of a fill level value to sensor signals at the individual sensor units 601-605 is illustrated in the following table:

| Sensor | Meaning when sensor X occupied | Control measure |
|---|---|---|
| 605 | Fill level 25% | Display devices 64 light up green |
| 604 | Fill level 50% | Belt speed of the conveyor belt 22 is reduced, display devices 64 light up green |
| 603 | Fill level 75% | Belt speed of the conveyor belt section 22 is reduced, display devices 64 light up orange |
| 602 | Fill level 100% | Conveyor belt 22 stops, display devices 64 light up red, product separation device 42 is adjusted to release another packing trough |

In the exemplary embodiment according to FIGS. 5A to 5B, four sensor units 611-618, which implement reflection sensors, are arranged at each of the packing troughs 40, 41 on an elongated, outer wall section 401. Each sensor 611-618 emits a sensor signal S along parallel signal paths S1-S4 in this case.

In the starting state according to FIG. 5A, the packing trough 40 is empty and ready to receive products, while the other packing trough 41 is blocked by the product separation device 42. In this case no (or only weak) reflected signals are received at the sensor units 611-614 of the packing trough 40.

If the packing trough 40 fills, as shown in FIG. 5B, products 7 initially collect in the region of the last sensor unit 614, the signal path S4 of which is therefore interrupted. A reflection occurs in this case at the product objects 7, which is received at the sensor unit 614 as a reflected signal.

The sensor units 611-614 each have a short range and a long range. A differentiation is made between the short range and the long range on the basis of the signal level of the reflected signals. If the reflected signal is strong and if the signal level of the received, reflected signal is greater than a first threshold value, it is thus concluded therefrom that the reflective product object 7 is located at short range to the sensor 611-614. If the signal level of the received, reflected signal is less than the first threshold value, in contrast, but is greater than a second threshold value, it is thus concluded therefrom that the reflective product object 7 is located at long range to the sensor 611-614.

In the state according to FIG. 5B, product objects 7 are located in the region of the sensor unit 614 such that a reflection takes place at short range and is detected accordingly at the sensor unit 614. The upstream sensor unit 613, in contrast, receives a reflected signal at long range, caused by a product object 7, which is located at long range to the sensor 613. It is concluded from this combination that the packing trough 40 has a fill level between 25% and 50%.

In the state according to FIG. 5C, the sensor units 613, 614 each detect product objects 7 at short range. It is concluded therefrom that the packing trough 40 is 50% filled.

If the packing trough 40 is completely filled, as illustrated in FIG. 5D, all sensor units 611-614 thus receive reflected signals at short range.

A control of the conveyance direction 2 and a control of the product separation device 42 can in turn be performed depending on the fill level, as has been described above for the exemplary embodiment according to FIGS. 4A to 4E.

The assignment of a fill level to the reflected sensor signals received at the sensor units 611-614 is illustrated in the following table:

| State | Meaning | Occupied sensors | Reaction on the basis of the items of sensor information |
|---|---|---|---|
| 1 | 0%, empty | None | Display devices 64 light up green |
| 2 | 0%-25% | Long range sensor 614 | Display devices 64 light up green |
| 3 | 25% | Long range and short range sensor 614 | Display devices 64 light up green |
| 4 | 25%-50% | Long range and short range sensor 614, long range sensor 613 | Display devices 64 light up green |
| 5 | 50% | Long range and short range sensor 614, long range and short range sensor 613 | Belt speed of the conveyor belt section 22 is reduced, display devices 64 light up green |
| 6 | 50%-75% | Long range and short range sensor 614, long range and short range sensor 613, long range sensor 612 | Belt speed of the conveyor belt section 22 is reduced, display devices 64 light up green |
| 7 | 75% | Long range and short range sensor 614, long range and short range sensor 613, long range and short range sensor 612 | Belt speed of the conveyor belt section 22 is reduced, display devices 64 light up orange |
| 8 | 75%-100% | Long range and short range sensor 614, long range and short range sensor 613, long range and short range sensor 612, long range sensor 611 | Belt speed of the conveyor belt section 22 is reduced, display devices 64 light up orange |
| 9 | 100%, full | Long range and short range sensor 614, long range and short range sensor 613, long range and short range sensor 612, long range and short range sensor 611 | Conveyor belt 22 stops, display devices 64 light up red, product separation device 42 is adjusted to release another packing trough |

To span a network of sensor units 601-610, as in the exemplary embodiment according to FIG. 2 or the exemplary embodiment according to FIGS. 4A to 4E, the sensor units 601-610 are assigned to one another such that, for example, N receivers receive sensor signals S from one emitter. For this purpose, it is necessary that the system is taught, i.e., pairs of sensor units 601-610 are formed, between which signal paths S2-S5 are spanned.

Figure 6:
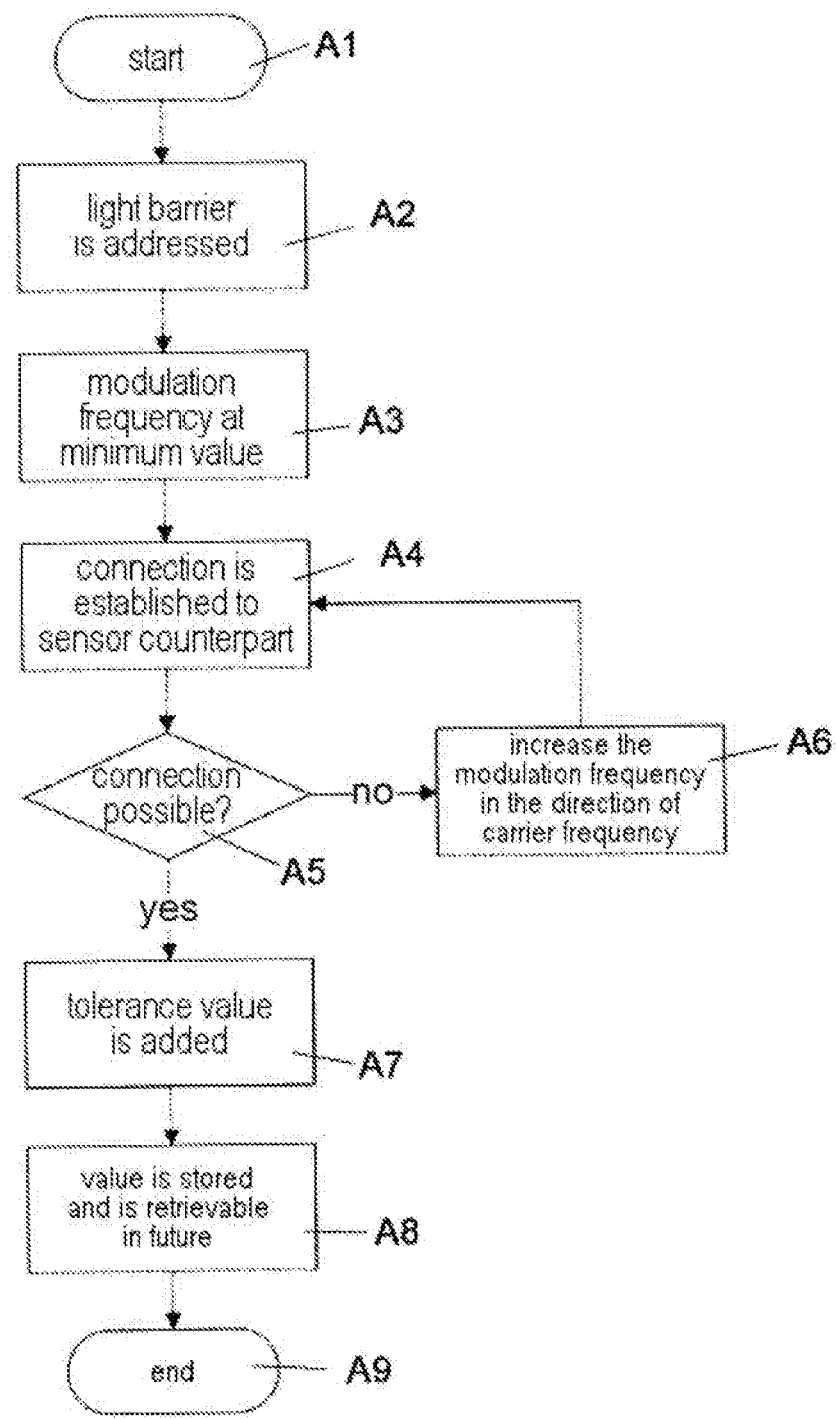
FIG. 6 shows a schematic flow chart for teaching a sensor device of the packing trough system.

The teaching can primarily be directed to being able to establish a connection structure at all between a sensor 601 used as an emitter and the sensors 602-605 used as receivers in the exemplary embodiment according to FIGS. 4A to 4E. A flow chart for this purpose is shown in FIG. 6.

After the start (step A1), firstly an emitting sensor unit 601 is addressed and requested to emit a sensor signal S to an assigned receiving sensor unit 602-605 (step A2). The modulation frequency of the sensor signal S is initially set in this case, for example, to a default value, corresponding to a minimum value of the modulation frequency (step A3). It is now checked whether a connection can be established to the receiving sensor unit 602-605, i.e., that the receiving sensor unit 602-605 receives the sensor signal S from the emitting sensor unit 601 (steps A4 and A5). If no connection is established, thus if there is no reception at the receiving sensor unit 602-605, the modulation frequency is thus increased in the direction of a carrier frequency, for example (step A6).

It is now checked again in steps A4 and A5 whether a connection is established. If a connection is established, a tolerance value is added to the modulation frequency used (step A7), the modulation frequency is stored and used in future for establishing the connection to this sensor unit 602-605 (step A8). The process is then ended (step A9).

Different procedures can be used for emitting the sensor signals S in steps A1 and A2 between an emitting sensor unit 601 and a receiving sensor unit 602-605 and for teaching the system.

For example, if there is a unique assignment between an emitting sensor unit 601 and a receiving sensor unit 602-605, the corresponding assigned ports of the control unit 43 are thus activated (see FIG. 2), so that the emitting sensor unit 601 emits a sensor signal S, which is received by the receiving sensor unit 602-605.

If multiple receivers 602-605 are assigned to one emitter 601, the emitter 601 is thus switched to active mode and emits sensor signals. The receiving sensor units 602-605 are switched to active mode sequentially by activating the corresponding ports of the control device 43, so that a sensor signal from the emitting sensor unit 601 is received sequentially at the receiving sensor units 602-605. The control unit 43 obtains a signal from one receiving sensor unit 602-605, which is presently switched to active mode, at one point in time.

If one receiving sensor unit is assigned to a plurality of emitting sensor units, the receiver is thus active while the emitting sensor units are activated to emit sensor signals sequentially. One signal is thus received from a currently emitting sensor unit at the receiving sensor unit at one point in time.

For example, a frequency of 38 kHz can be used as the default value for the carrier frequency. The variation of the carrier frequency can be performed, for example, in steps of approximately 75 Hz. For example, a receiver can have the greatest sensitivity at the default carrier frequency of 38 kHz, wherein the sensitivity of the receiver can be changed by variation of the modulation frequency. By intentionally worsening the sensitivity, a (low) damping, for example, can be set at the receiver, which enables sensing, for example of transparent objects.

For the sensor units 601-605 to recognize one another, it is only necessary per se for the sensor units 601-605 to exchange signals with one another. This can be performed in a chronologically sequential manner, as described above. In this case, the sensor signals S do not have to have a particular form and in particular do not have to contain a special identifier.

Figure 7:
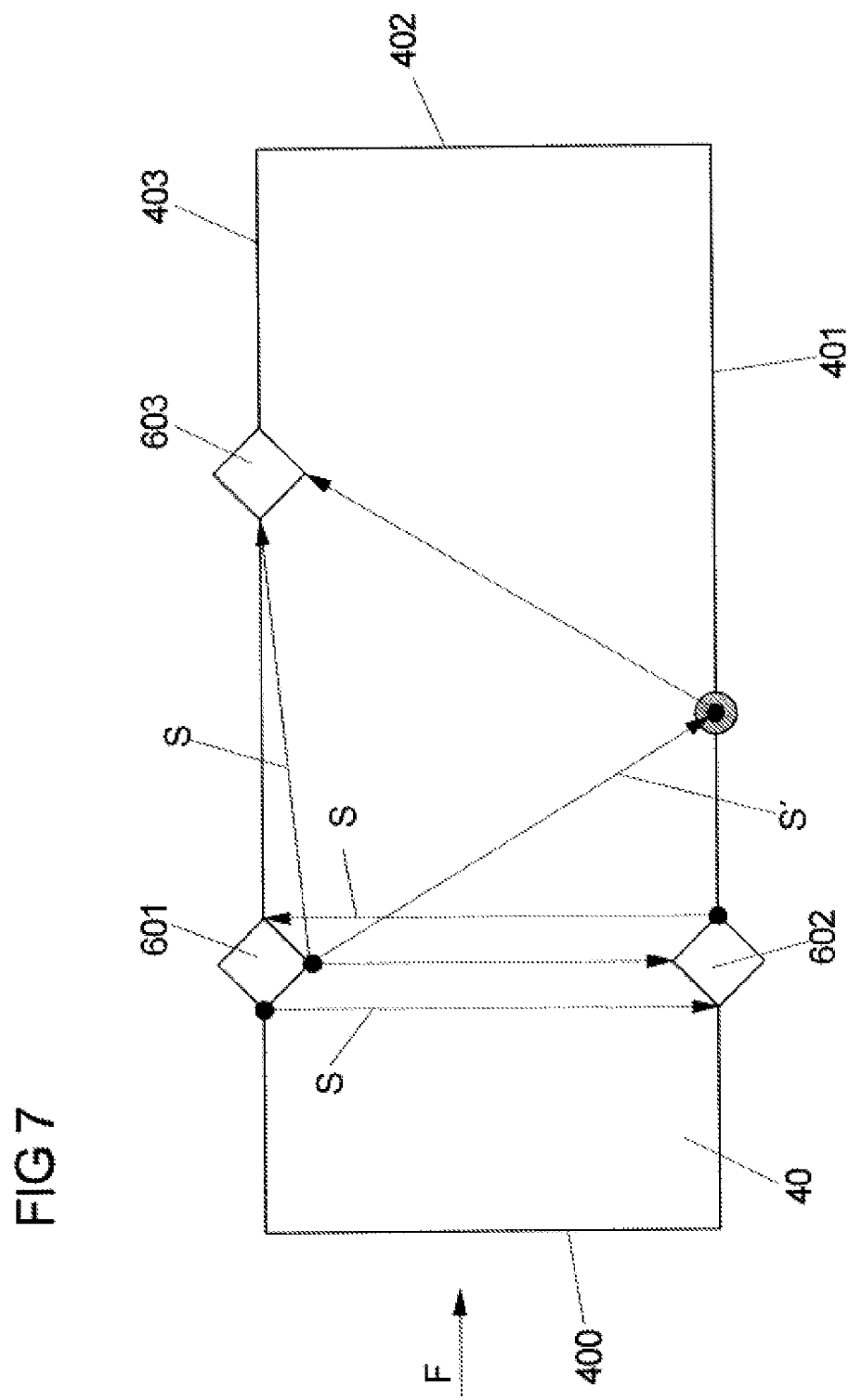
FIG. 7 shows a schematic view of a packing trough system having a sensor device arranged thereon.

In order that the sensor units can mutually identify one another, the sensor units 601-610 can however also be provided with a separate address in the form of an identification identifier. To mutually identify one another, the sensor units 601-610 can exchange their identification codes in this case, which makes possible a unique recognition and assignment of the sensor signals S to a specific emitter, so that multiple emitters can also emit their sensor signals simultaneously in the scope of the teaching. If, controlled by the control device 43, for example in the arrangement according to FIG. 7, the sensor unit 601 is requested to identify itself in relation to the other sensor units 602, 603, the sensor unit 601 emits a test signal which contains the identifier of the emitting sensor unit 601. The receiving sensor units 602, 603 can therefore uniquely identify the emitting sensor units 601 on the basis of the received test signal, wherein different signal propagation paths, for example also indirect propagation paths are possible by reflection at a wall section 401 (signal S').

Such a test signal can have the form of a bit sequence, for example, in the scope of which, for example, different pulses are emitted. Thus, a sensor signal S can have, for example, three pulses having a length of 20 μs each and a high signal level, between each of which pulses having a pulse length of 35 μs and a low signal level are emitted, so that a pulse having a high signal level is followed by a pulse having a low signal level. A pulse sequence 10101 results.

However, such a test signal can also be a unique ID, for example an address identifier such as a MAC address or an ID which is dynamically assigned by the control device 43, for example.

The propagation path can simultaneously also be used as a characteristic for the position determination of the sensor units 601-603. Thus, the signal level of the received test signals can be analyzed to determine the distance of the receiving sensor units 602, 603 from the emitting sensor units 601 via this signal level.

It can additionally be recognized by the repeated measurement of test signals and the signal level thereof whether a change occurs in the relative position of the sensor units 601-603 in relation to one another.

Figure 8:
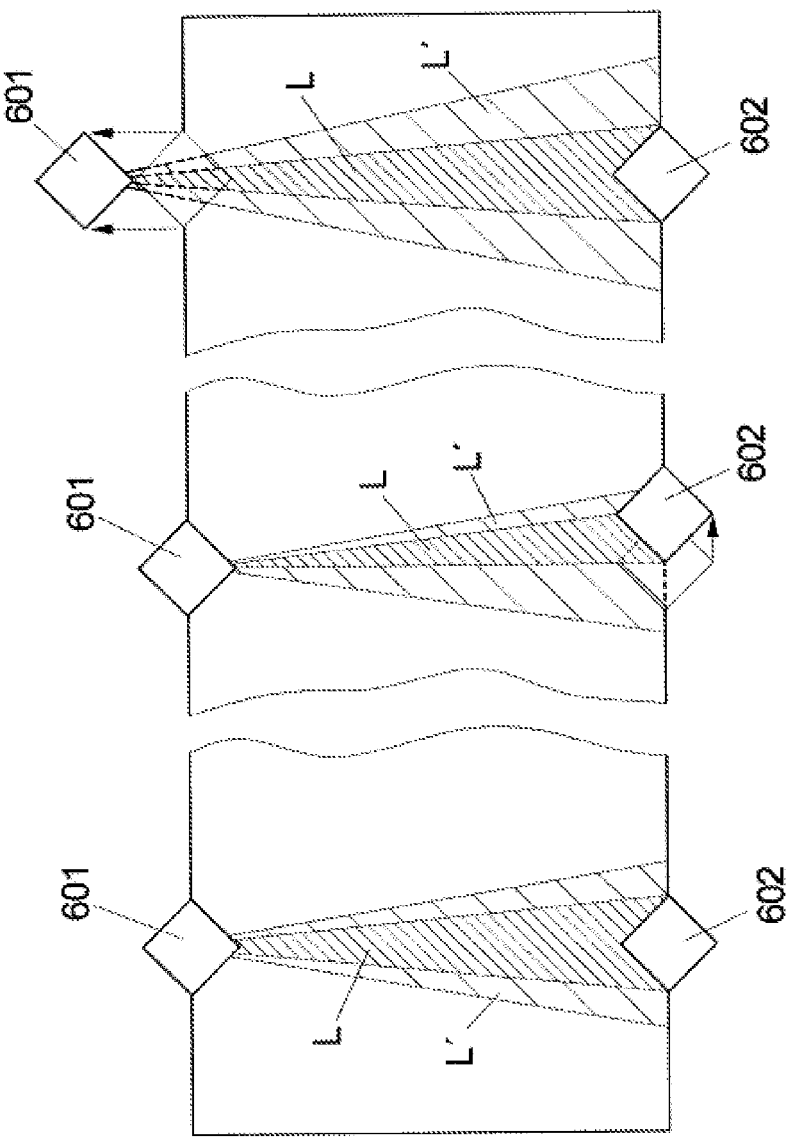
FIGS. 8A-8C show a schematic view of sensor units of a sensor device in different spatial location relationships.

This is illustrated in FIGS. 8A to 8C. Thus, a receiving sensor unit 602, when it is arranged in the correct location relationship in relation to an emitting sensor unit 601 (FIG. 8A) will thus receive a test signal having a specific signal level. The receiving sensor unit 602 is arranged in this case, for example, inside a main light cone L of the emitting sensor unit 601 and accordingly receives a comparatively strong signal.

If the relative position of the receiving sensor unit 602 in relation to the emitting sensor unit 601 is changed and the receiving sensor unit 602 is displaced, for example, into a scattered light cone L' of the emitting sensor unit 601 (FIG. 8B), the signal level of the received test signal thus becomes weaker, which can be measured accordingly. The signal level of the received test signal also becomes weaker, if the distance between the emitting sensor unit 601 and the receiving sensor unit 602 increases (FIG. 8C), which can also be recognized accordingly. The spatial location change between the emitter and the receiver can indicate an attempt at manipulation at the sensor device 6, for example.

Such a scattered light cone L' results, for example, in the case of infrared sensors which use infrared LEDs. In general, such infrared sensors have the greatest intensity along their central light axis, which drops outward radially in relation to the light axis. A scattered light cone around the central light axis having a cone angle of 35° results, for example.

Figure 9:
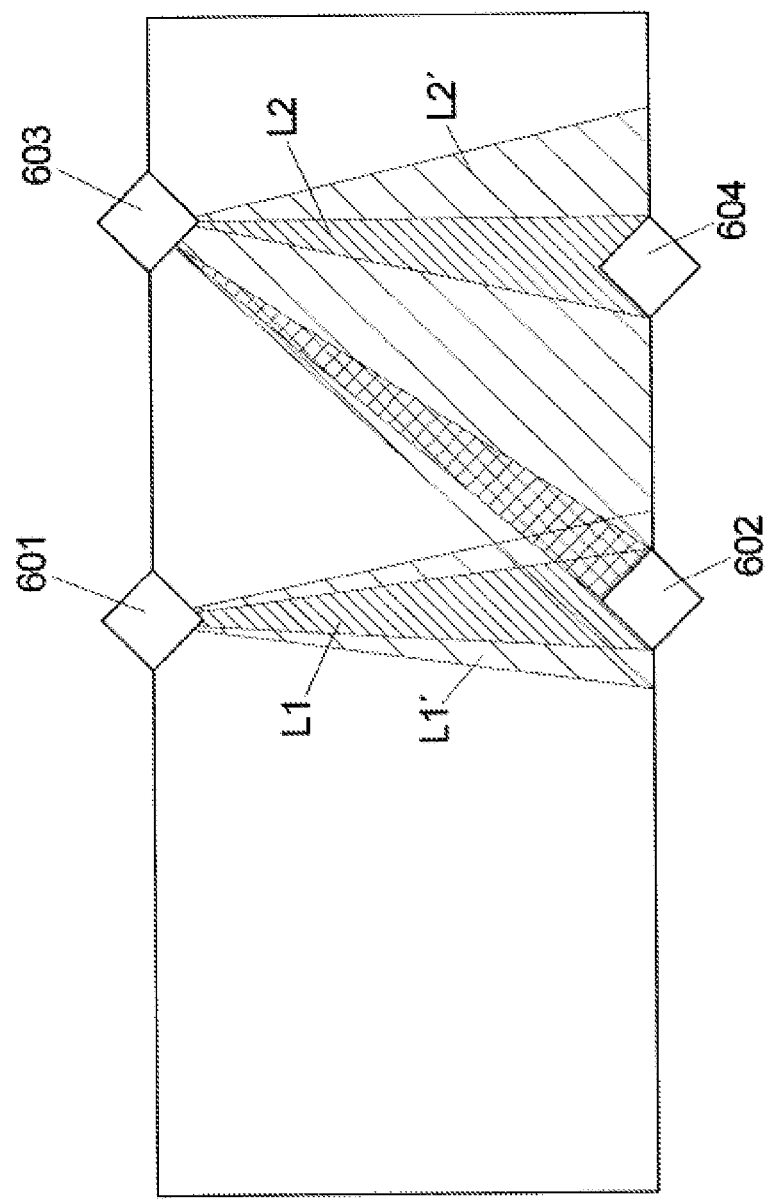
FIG. 9 shows a schematic view of an arrangement of sensor units of a sensor device on a packing trough.

In addition, the determination of the spatial location relationship between sensor units 601-604 can also be improved by scattered light measurements, as illustrated in FIG. 9. Thus, in the arrangement according to FIG. 9, one receiving sensor unit 602, 604 is assigned to each of the emitting sensor units 601, 603. The emitting sensor unit 601 emits a main light cone L1, in which the assigned receiving sensor unit 602 is located, and additionally emits a scattered light cone L1'. The other emitting sensor unit 603 emits a main light cone L2, within which the assigned receiving sensor unit 604 is located. In addition, this emitting sensor unit 603 also emits a comparatively broad scattered light cone L2'. The receiving sensor unit 602, which is actually assigned to the emitting sensor unit 601, is also located within this scattered light cone L2'. The receiving sensor unit 602 assigned to the emitting sensor unit 601 therefore also receives scattered light from the scattered light cone L2' of the other emitting sensor unit 603 and can draw conclusions on the basis of a measurement of the level strength of this scattered light about the relative location relationship in relation to the emitting sensor unit 603.

Figure 10:
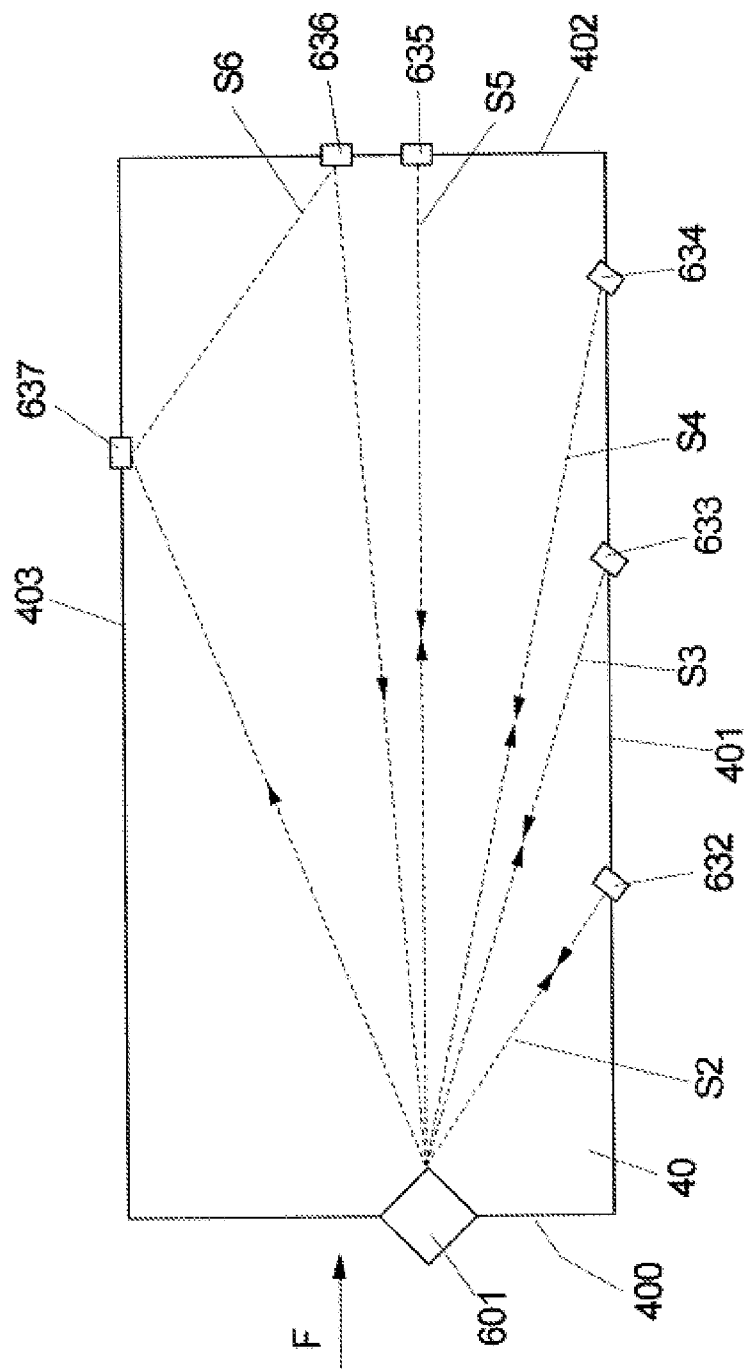
FIG. 10 shows a schematic view of another exemplary embodiment of a sensor device on a packing trough.

In principle, a single sensor unit can be sufficient to span a network of different signal paths S2-S6, as shown in FIG. 10. In the exemplary embodiment according to FIG. 10, one sensor unit 601 emits five different sensor signals, which propagate on different signal paths S2-S6 over the packing trough 40 and are guided, by reflection at reflection points 632-637, back to the sensor unit 601 and are received there again. In this case, signal paths are also possible which are guided by multiple reflections back to the sensor unit 601, as in the signal paths S6 in FIG. 10. The fill level of the packing trough 40 can again be concluded on the basis of the interruption of a signal path S2-S7.

For example, the sensor signals emitted by the sensor unit 601 are generated on the basis of patterns, which are stored in a database of the control device 43. In this manner, different sensor signals can be generated, which are assigned to the individual signal paths S2-S6. The sensor signals assigned to the different signal paths S2-S6 can be differentiated from one another on the basis of the received light pulses at the sensor unit 601, for example on the basis of the number and duration of the light pulses.

Figure 11:
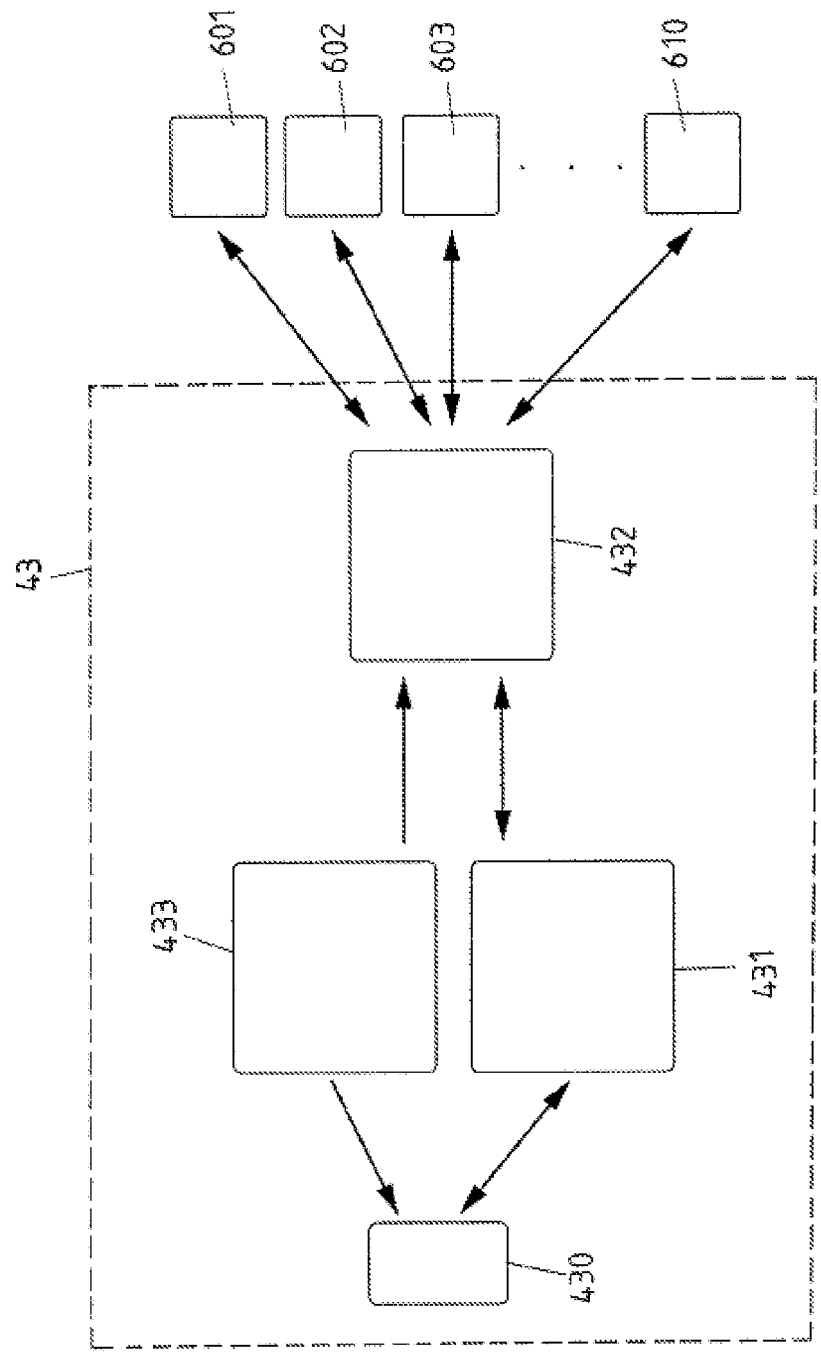
FIG. 11 shows a schematic view of a control device for controlling the sensor units.

FIG. 11 shows a schematic view of a control device 43 for controlling the system and in particular the sensor units 601-610.

It is to be noted here that a unified control device 43 can be provided to activate the sensor units 601-610 and perform signal processing. However, it is also conceivable and possible to provide different units, which jointly assume controlling functions and are part of the overall system at the same time.

In the exemplary embodiment according to FIG. 11, a first control unit 430 is provided, which can be implemented by a PC system, for example, and is used, for example, to execute a concrete application of a cash register system. A second control unit 431, which can be embodied, for example, as a programmable logic controller (PLC) or also as an electronic controller and is connected to a third control unit 432, is connected to this first control unit 430.

The sensor units 601-610 are activated via the third control unit 432, and a first signal analysis of signals which are received by the sensor units 601-610 also takes place at the third control unit 432, for example. For example, the third control unit 432, which can be embodied as an electronics board, can already perform a first analysis of a fill level of a packing trough 40, 41 on the basis of the signals received by the sensor units 601-610.

The third control unit 432 can also be integrated into the second control unit 431, for example. However, it is also conceivable and possible to embody the third control unit 432 and the second control unit 431 as separate units, which are connected to one another via a suitable connection, for example a data connection in the form of a network connection.

The third control unit 432 can, for example, perform a first analysis of the signals received by the sensor units 601-610. Results of this first analysis can be transmitted to the higher-order, second control unit 431, which carries out a further analysis and communicates with the first control unit 430. The control unit 430 which controls the higher-order system can then evaluate data which it receives from the second control unit 431, to control a conveyor belt system 2 as a function thereof, for example. The control unit 430 can also trigger an adjustment of the product distributing guide 42, for example, wherein the control of the movement procedure of the product distributing guide 42, i.e., for example, an activation of a drive unit of the product distributing guide 42, can be performed by the second control unit 431, to which the product distributing guide 42 is connected.

A scanning device 433, for example in the form of a product scanner 3 (see FIG. 1), which in turn also communicates with the third control unit 432, can be connected to the first control unit 430. For example, monitoring can be performed in this manner by interaction of the scanning device 433 with the sensor units 601-610. For example, if it is established that a product object 7 arrives in the region of a packing trough 40, 41 (which can be established on the basis of a change of the fill level in this packing trough 40, 41), although no product object 7 has been scanned at the scanning device 433, this can indicate an attempt at manipulation.

Figure 12:
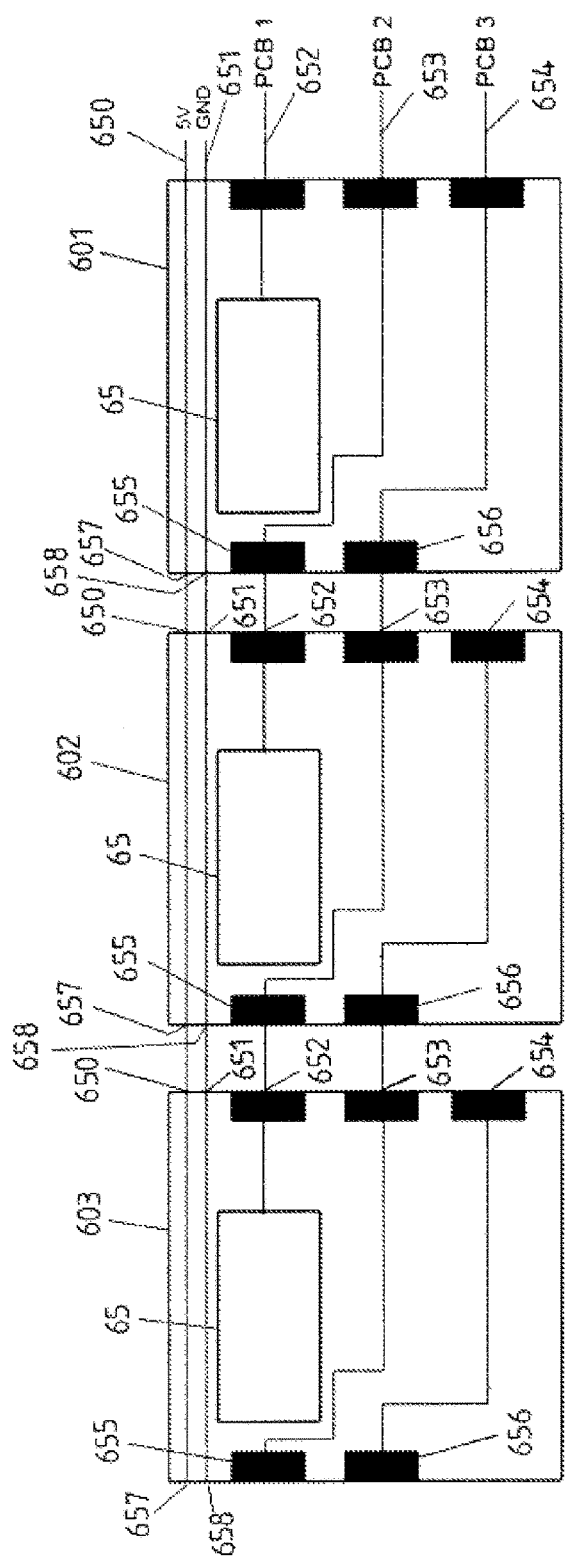
FIG. 12 shows a schematic view of an exemplary embodiment of the interconnection of the sensor units.

FIG. 12 shows an exemplary embodiment of an interconnection of different sensor units 601-603.

The sensor units 601-603 can thus each have an assembly 65, which comprises the components required for the sensor function of the sensor unit 601-603, for example an emitter unit and/or a receiver unit. The sensor units 601-603 are each embodied modularly and comprise input-side terminals 650-654 and output-side terminals 655-658.

A power supply can be connected to the sensor units 601-603 via the input-side terminals 650, 651, wherein the sensor units 601-603 are interconnected in series, so that output-side terminals 657, 658 of one sensor unit 601, 602 are connected to input-side terminals 650, 651 of the next sensor unit 602, 603, to transmit a supply voltage toward the next sensor unit 602, 603.

An interconnection of the sensor assemblies 65 of the sensor units 601-603 can be performed in a cascaded form via the remaining terminals. Thus, a first sensor line, via which signals can be transmitted toward and away from the sensor assembly 65 of the first sensor unit 601, can be connected to an input-side terminal 652 of the first sensor unit 601. A second sensor line, in contrast, is connected to a terminal 653 of the first sensor unit 601 and a third sensor line is connected to an input-side terminal 654 of the first sensor unit 601.

The input-side terminal 653 of the first sensor unit 601 is wired to the output-side terminal 655 of the first sensor unit 601, which is in turn connected to the input-side terminal 652 of the second sensor unit 602, so that via this, the second sensor line is connected to the sensor assembly 65 of the second sensor unit 602. The input-side terminal 654 of the first sensor unit 601, in contrast, is connected to the output-side terminal 656 of the first sensor unit 601, which is in turn connected to the input-side terminal 653 of the second sensor unit 602. This input-side terminal 653 of the second sensor unit 602 is wired to the output-side terminal 655 of the second sensor unit 602, which is connected to the input-side terminal 652 of the third sensor unit 603, so that the assembly 65 of the third sensor unit 603 is connected to the third sensor line.

This cascaded form of the interconnection is fundamentally scalable as desired, wherein for the cascaded connection of more than three sensor units 601-603 to one another, more terminals are accordingly to be provided on the individual sensor units 601-603. A star circuit of the type shown in principle in FIG. 11 is implemented by the cascaded interconnection, wherein the number of the cables to be laid can be reduced, because lines can be combined.

The concept on which the invention is based is not restricted to the above-described exemplary embodiments, but rather may also be implemented in entirely different ways.

A fill level recognition in the form described here is not restricted in principle to product checkout systems. For example, in reverse vending machines, for example for beverage containers, packing troughs can also be present, into which containers are conveyed and at which a fill level recognition can be performed according to the type described here.

The sensors are not necessarily embodied as infrared emitters and/or receivers, but rather can also be designed differently. For example, ultrasonic sensors, capacitive sensors, inductive sensors, pressure sensors, cameras, or the like can also be used.

LIST OF REFERENCE SIGNS 1 product checkout system
2 conveyor system
20-24 conveyor device
3 product scanner
4 packing trough system
40, 41 packing trough 400-403 side
42 product separation device
420 pivot axis
43 control device
430-432 control units
433 scanning device
44 drive device
5 payment terminal
6 sensor device
601-610 sensor unit
611-614 sensor unit
62, 632-637 reflection point
64 display device
7 object
A1-A9 steps
D pivot direction
F conveyor device
L, L', L1, L1', L2, L2' light cone family
P path
S, S' sensor signal
S1-S6 signal path

What is claimed is:

1. A reception system for receiving objects, comprising
a reception system of either a checkout counter or a reverse vending machine,
a scanner and scanning system for receiving objects,
at least one reception device for receiving objects,
a conveyor device, which has at least one conveyor belt section for conveying objects in a conveyance direction into the at least one reception device, and
a sensor device, which is arranged on the at least one reception device, for detecting objects in the at least one reception device,
wherein the sensor device is designed to emit sensor signals along different signal paths over the reception device, and to determine a fill level of objects in a reception area, wherein the fill level is an assessment of an accumulation of objects along a horizontal plane as the objects are introduced into the at least one reception device, and the sensor device determines the fill level on the basis of an interaction of at least one of the sensor signals with objects conveyed into the reception device,
wherein the sensor device is designed to determine a plurality of fill levels.

2. The reception system according to claim 1, wherein the sensor signals are formed by signals of infrared light.

3. The reception system according to claim 1, wherein the sensor device has either one emitter for emitting sensor signals and a plurality of receivers for receiving the sensor signals or a plurality of emitters for emitting sensor signals and one receiver for receiving the sensor signals.

4. The reception system according to claim 1, wherein the at least one reception device is bordered at least in sections by wall sections, wherein sensor units are arranged spatially offset on different wall sections of the at least one reception device.

5. The reception system according to claim 1, wherein a first sensor unit, which forms an emitter, is arranged on a first wall section of the at least one reception device and a second sensor unit, which forms a receiver, is arranged opposite to the first sensor unit on a second wall section opposite to the first wall section.

6. The reception system according to claim 1, wherein at least one sensor unit of the sensor device is designed as a reflection sensor for emitting a sensor signal and for receiving a reflected signal.

7. The reception system according to claim 6, wherein the sensor device is designed to determine a distance value of the at least one reflection sensor to a reflected object on the basis of a received reflected signal.

8. The reception system according to claim 6, wherein the at least one sensor unit designed as a reflection sensor is designed to determine, by comparison of a signal level of a received reflected signal to different threshold values, whether the reflected signal has been reflected by an object at short range to the sensor unit or at long range to the sensor unit.

9. The reception system according to claim 1, wherein at least one sensor unit of the sensor device is designed as a reflection sensor for emitting a sensor signal and for receiving a reflected signal and additionally for receiving an emitted signal of another sensor device.

10. The reception system according to claim 1, wherein the reception system has a control device for analyzing sensor data obtained on the basis of the sensor signals, to conclude the fill level of the reception device on the basis of the sensor data.

11. The reception system according to claim 10, wherein the control device is designed to control the conveyance speed of at least one conveyor belt section of the conveyor device as a function of an ascertained fill level.

12. The reception system according to claim 10, wherein the reception system has an object separation device arranged on the conveyor device, which is adjustable to guide objects into different reception devices, wherein the control device is designed to activate a drive device to adjust the object separation device as a function of an ascertained fill level.

13. The reception system according to claim 1, wherein sensor units of the sensor device each have a display device for outputting visual display signals as a function of a fill level of the reception device.

14. The reception system according to claim 1, wherein a sensor unit, which is designed as an emitter, of the sensor device is designed to emit a sensor signal, which contains an identification identifier and is used as a test signal, for mutual identification, to at least one other sensor unit designed as a receiver.

15. The reception system according to claim 14, wherein the sensor unit is designed to analyze the test signal received at the sensor unit designed as a receiver and to compare the signal level of the test signal to a stored reference value, to conclude a change at the sensor device on the basis of the comparison.

* * * * *